United States Patent
Shiohara et al.

(10) Patent No.: US 8,068,240 B2
(45) Date of Patent: Nov. 29, 2011

(54) IMAGE PROCESSING USING UNDEVELOPED IMAGE DATA

(75) Inventors: Ryuichi Shiohara, Matsumoto (JP); Ichiro Fujii, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1058 days.

(21) Appl. No.: 11/903,697

(22) Filed: Sep. 24, 2007

(65) Prior Publication Data

US 2008/0074684 A1    Mar. 27, 2008

(30) Foreign Application Priority Data

Sep. 25, 2006  (JP) ................................. 2006-258614
Jun. 21, 2007  (JP) ................................. 2007-163409

(51) Int. Cl.
*G06F 15/00*    (2006.01)
*G06F 3/12*     (2006.01)
*G06K 1/00*     (2006.01)
*H04N 1/60*     (2006.01)

(52) U.S. Cl. ....................................... 358/1.13; 358/1.9
(58) Field of Classification Search .................. 358/1.1, 358/1.13, 1.14, 1.9, 1.6
See application file for complete search history.

(56) References Cited

U.S. PATENT DOCUMENTS

| | | | |
|---|---|---|---|
| 2005/0175260 A1* | 8/2005 | Takahashi | 382/309 |
| 2005/0238227 A1* | 10/2005 | Takahashi | 382/162 |
| 2006/0055984 A1* | 3/2006 | Minakuti et al. | 358/448 |
| 2007/0052987 A1* | 3/2007 | Jung | 358/1.9 |

FOREIGN PATENT DOCUMENTS

| | | |
|---|---|---|
| JP | 11-164149 | 6/1999 |
| JP | 2001-223979 | 8/2001 |
| JP | 2003-250053 | 9/2003 |
| JP | 2004-128809 | 4/2004 |
| JP | 2005-33255 | 2/2005 |
| JP | 2005-63128 | 3/2005 |
| JP | 2005-175978 | 6/2005 |
| JP | 2006-203555 | 8/2006 |
| JP | 2006-203572 | 8/2006 |

\* cited by examiner

*Primary Examiner* — Douglas Tran
(74) *Attorney, Agent, or Firm* — Nutter McClennen & Fish LLP; John J. Penny, V.

(57) ABSTRACT

To provide technology for easily carrying out image processing for printing or display purposes using undeveloped image data. A print control device comprises: a processing condition determining section that determines processing conditions for printing; and a print data generating section that generates print data from original image data according to the processing conditions. The processing condition determining section comprises: a first setting section that causes a first setting screen to be displayed, the first setting screen allowing a user to make settings for a first items group, for a purpose of determining the processing conditions for the first type of original image data that is developed; and a second setting section that causes a second setting screen to be displayed, the second setting screen allowing the user to make settings for a second items group, for a purpose of determining the processing conditions for the second type of original image data that is undeveloped. The second items group includes a specific item not included in the first items group. The print data generating section executes on the second type of original image data a developing process that includes a specific process according to a setting for the specific item.

18 Claims, 14 Drawing Sheets

IMAGE PROCESSING USING UNDEVELOPED IMAGE DATA

CROSS REFERENCE

The present application is based on, and claims priority from, Japanese Applications No. 2006-258614 filed Sep. 25, 2006 and No. 2007-163409 filed Jun. 21, 2007, the disclosures of which are herein incorporated by reference.

BACKGROUND

1. Technical Field

The present invention relates to technology for carrying out printing or display using undeveloped image data.

2. Related Art

A digital still camera (hereinafter also called a "camera") typically performs a developing process (digital image processing) on RAW image data to create developed image data (e.g. JPEG image data), and then records the developed image data into a memory card. Note that the RAW image data is data created by a camera that executes an analog-to-digital conversion of light detection values detected by an image sensor (e.g. a CCD or CMOS), and that records one frame of image data, i.e. aggregate pixel data, in unmodified form. In other words, the RAW image data is data that has not undergone the developing process in the camera. Some recent cameras can store the RAW image data to the memory card. Typically, an image file that records RAW image data also records the information about the settings during shooting.

However, image processing for printing or display purposes using RAW image data has not been contemplated sufficiently, and it has been impossible to easily carry out image processing for printing or display purposes using RAW image data.

SUMMARY

An object of the present invention is to provide technology for easily carrying out image processing for printing or display purposes using undeveloped image data.

According to a first aspect of the invention, there is provided a print control device that utilizes a display section and a print execution section. The print control device comprises: a processing condition determining section that determines processing conditions for printing using original image data; and a print data generating section that generates print data from the original image data according to the processing conditions, the print data being supplied to the print execution section. The processing condition determining section comprises: a first setting section that, if the original image data is a first type of original image data that is developed, causes a first setting screen to be displayed on the display section, the first setting screen allowing a user to make settings for a first items group, for a purpose of determining the processing conditions for the first type of original image data; and a second setting section that, if the original image data is a second type of original image data that is undeveloped, causes a second setting screen to be displayed on the display section, the second setting screen allowing the user to make settings for a second items group, for a purpose of determining the processing conditions for the second type of original image data. The second items group includes a specific item not included in the first items group. The print data generating section comprises: a developing process section that, if the original image data is the second type of original image data, executes on the second type of original image data a developing process that includes a specific process according to a setting for the specific item.

With this device, print data can be generated from the first type of original image data, and print data can be also generated from the second type of original image data after executing the developing process, whereby printing can be carried out easily, even if the second type of original image data is used. In particular, with this device, the second setting screen includes the specific item not included in the first setting screen. Therefore if printing is carried out using the second type of original image data, the developing process that includes the specific process corresponding to the specific item can be executed on the second type of original image data, and print data can be generated easily.

According to a second aspect of the invention, there is provided an image processing device. The image processing device comprises: a processing condition determining section that determines processing conditions for image processing of original image data; and an image processing section that executes image processing of the original image data according to the processing conditions. The processing condition determining section comprises: a first setting section that, if the original image data is a first type of original image data that is developed, causes a first setting screen to be displayed on the display section, the first setting screen allowing a user to make settings for a first items group, for a purpose of determining the processing conditions for the first type of original image data; and a second setting section that, if the original image data is a second type of original image data that is undeveloped, causes a second setting screen to be displayed on the display section, the second setting screen allowing the user to make settings for a second items group, for a purpose of determining the processing conditions for the second type of original image data. The second items group includes a specific item not included in the first items group.

With this device, image processing can be executed on the first type of original image data, and image processing can be also executed on the second type of original image data. In particular, with this device, the second setting screen includes the specific item not included in the first setting screen, and therefore image processing that includes a specific process corresponding to the specific item can be easily executed on the second type of original image data.

It should be noted that the present invention may be actualized by a diversity of applications such as a print control device, a printer including the print control device, a print control method, an image processing device, a printer or display including the image processing device, an image processing method, computer programs that attain these methods or functions of these apparatuses, recording media in which such computer programs are recorded, and data signals that include such computer programs and are embodied in carrier waves.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention are discussed below based on examples in the following order.
  A. Printer Configuration:
  B. Printing Process:
  C. Exposure Correction Process:
  D. Adjustment of Image Data for Display:
  D-1. First Adjustment Method:
  D-2. Second Adjustment Method:
  D-3. Third Adjustment Method:
  E. Adjustment of Image Data for Display Depending on Exposure Correction Level:
  E-1. First Adjustment Method:
  E-2. Second Adjustment Method:
  E-3. Third Adjustment Method:
  F. Modification Examples:
  F-1. First Modification Example:
  F-2. Second Modification Example:

A. PRINTER CONFIGURATION

Figure 1:
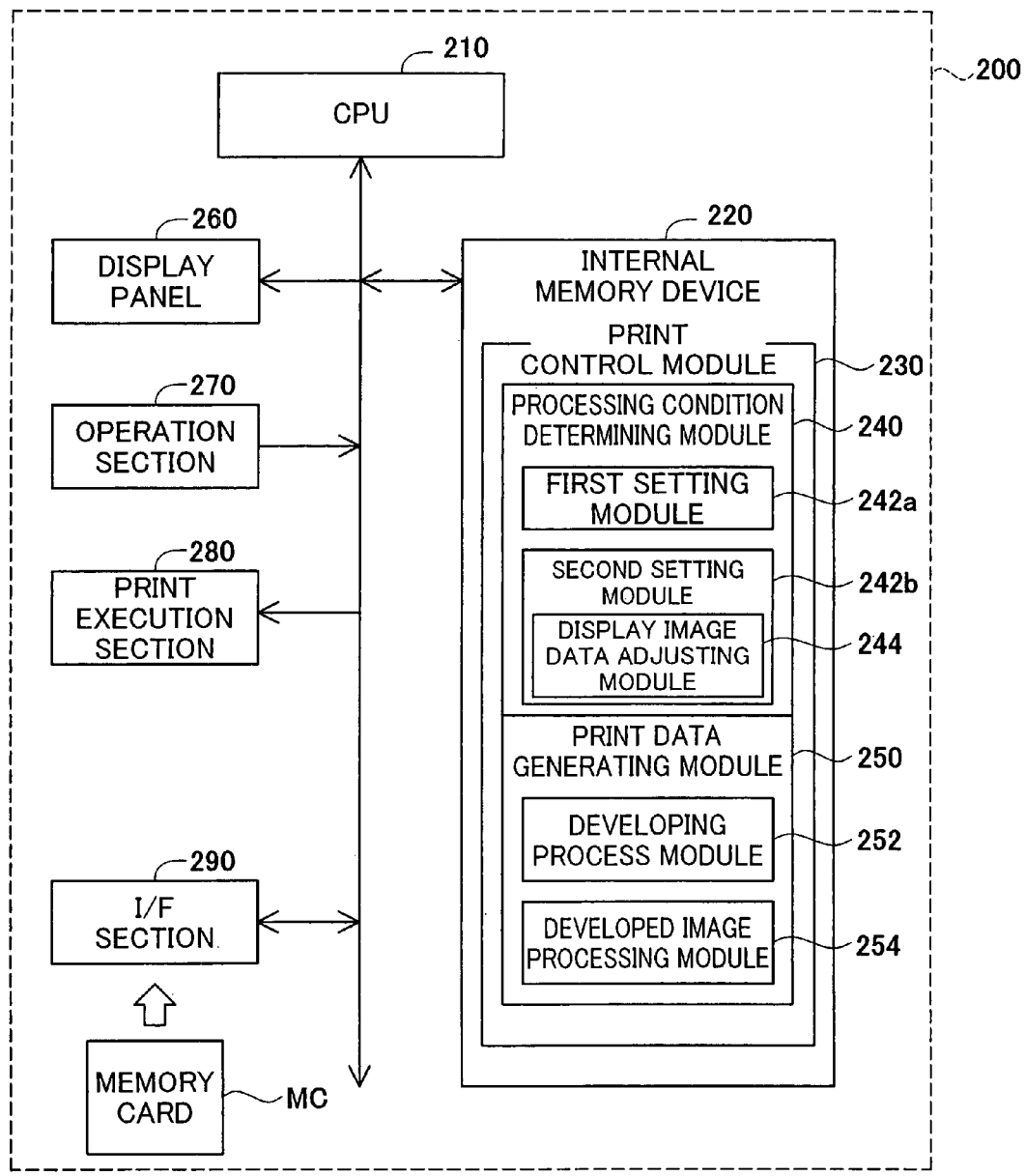
FIG. 1 shows a printer 200 according to the present embodiment.

FIG. 1 shows a printer 200 according to the present embodiment. This printer 200 has a function of direct printing, that is, a function of printing without a personal computer, using image data generated by a digital still camera and supplied directly via a memory card MC. In particular, the printer 200 of the present embodiment can carry out printing using JPEG image data, as well as carrying out printing using RAW image data. JPEG image data is image data (also termed developed image data) that has been compressed in the JPEG format after having undergone a developing process (image generation process) in the camera for viewing purpose. RAW image data, on the other hand, is undeveloped image data of RAW format that has not undergone a developing process (image generation process) in the camera. Specifically, RAW image data is "raw" image data obtained through analog-to-digital conversion of light intensity detected by the camera's image sensor (e.g. a CCD or CMOS), and is image data prior to any developing process (image generation process). In the present embodiment, if printing is executed using RAW image data, image data (developed image data) that has been compressed in JPEG format after having undergone the developing process (image generation process) is generated in the printer 200. Note that in the present embodiment, while JPEG-compressed developed image data is generated in the printer 200, if memory capacity is sufficient, undeveloped image data that has not undergone JPEG compression may be generated instead.

In the present embodiment, developed image data of JPEG format that has undergone the developing process in the camera is also referred to as "JPEG image data," and developed image data of JPEG format that has undergone the developing process in the printer is also referred to as "image data for printing."

Developed image data and RAW image data differ in that an image represented by developed image data is viewable immediately on a monitor or the like, whereas an image represented by RAW (undeveloped) image data is not viewable immediately. The developing process is necessary in order to convert an image represented by RAW (undeveloped) image data to a viewable condition.

As shown in FIG. 1, the printer 200 includes a CPU 210, an internal memory device 220 such as ROM and RAM, a display panel 260, a operation section 270 including buttons or the like, a print execution section 280 for executing printing, and an interface section (I/F section) 290.

The I/F section 290 includes a card slot for inserting the memory card MC. The memory card MC records a image file which is generated in the camera when a subject is photographed, and the I/F section 290 reads out the image files that have been recorded in the memory card MC.

Figure 2:
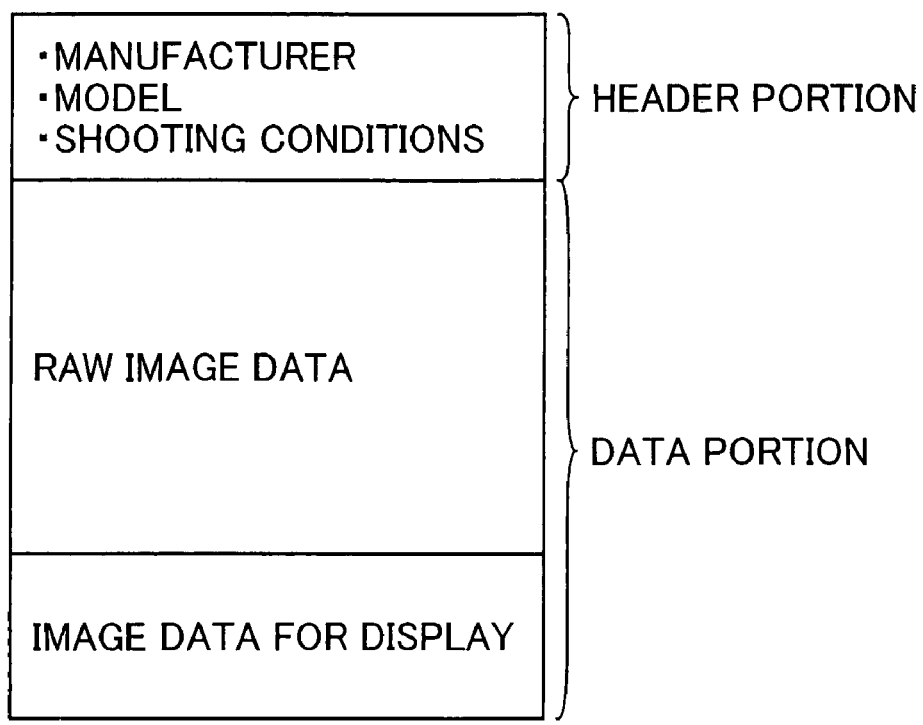
FIG. 2 illustratively shows a structure of a RAW image file containing RAW image data.

FIG. 2 illustratively shows a structure of a RAW image file containing RAW image data. The RAW image file is created in a data format similar to the Exif (Exchangeable Image File Format) format, and includes a header portion and a data portion, as shown.

The header portion describes supplemental information, such as manufacturer and model number of the camera that created the RAW image file, shooting conditions, shooting date and so on. Shooting conditions include, for example, shutter speed, aperture value, and white balance setting value at the time of shooting.

The data portion includes RAW image data generated during shooting, and image data for display. The RAW image data and the image data for display represent the same subject (photographed image), and both the RAW image data and the image data for display are recorded at the same time as shooting. The image data for display is used, for example, for rough display of the photographed image on the camera's display panel, and takes the form of JPEG image data of reduced size developed in the camera. The image data for display has relatively low resolution (e.g. 640×480), and is also termed screen nail image data. The image data for display has sufficient resolution and picture quality for display on the display panel.

Note that the structure of the RAW image file differs depending on the camera manufacturer and the individual camera model, and some RAW image files may contain both RAW image data and JPEG image data. In this case the RAW image data and JPEG image data represent the same subject (photographed image), and both the RAW image data and the image data for display are recorded at the same time as shooting.

Note that the RAW image file may also include JPEG image data for display purposes. Alternatively, the RAW image file containing the RAW image data and the JPEG image file containing the JPEG image data may be recorded at the same time as shooting. In this case, the two image data represent the same subject (photographed image). Thus, it is preferable that the two files are assigned the same file name with different extensions, e.g. "ABCD0123.RAW" and "ABCD0123.JG, in order to make explicit the relationship of the two files. In this case, the JPEG image data is used as image data for display purposes corresponding to the RAW image data.

While FIG. 2 describes a RAW image file containing RAW image data, a JPEG image file containing JPEG image data, like a RAW image file, also includes a header portion and a data portion. However in a JPEG image file, the data portion typically contains JPEG image data and thumbnail image data of relatively low resolution (e.g. 160×120), instead of the RAW image data and the image data for display. This file configuration conforms to the JEITA DCF 2.0 standard.

The internal memory device 220 (FIG. 1) stores a computer program (printer driver) that functions as a print control module 230. The functions of the print control module 230 are realized through execution of the computer program by the CPU 210. The computer program may be pre-stored as firmware in the internal memory device 220, or may be provided in a form recorded on a computer-readable recording medium such as CD-ROM.

The print control module 230 includes a processing condition determining module 240 and a print data generating module 250, and executes various processes for printing.

The processing condition determining module 240 (FIG. 1) has a first setting module 242a and a second setting module 242b, and displays a setting screen and determines processing conditions for printing.

The first setting module 242a, if printing is to be executed using JPEG image data, displays a JPEG image print setting screen that includes a plurality of setting items, and acquires contents of the setting items that are set on the setting screen by the user. When the beginning of printing is instructed by the user, the processing condition determining module 240 determines, on the basis of the contents of the setting items acquired by the first setting module 242a, the processing conditions for printing using JPEG image data.

In the present embodiment, the first setting module 242a displays, on the JPEG image print setting screen, a reference image that indicates a selected image for printing. Specifically, the first setting module 242a reduces the JPEG image data selected for printing, and generates reference image data representing the reference image.

The second setting module 242b, if printing is to be executed using RAW image data, displays a RAW image print setting screen that includes a plurality of setting items, and acquires contents of the setting items that are set on the setting screen by the user. When the beginning of printing is instructed by the user, the processing condition determining module 240 determines, on the basis of the contents of the setting items acquired by the second setting module 242b, the processing conditions for printing using RAW image data.

In the present embodiment, the second setting module 242b displays, on the RAW image print setting screen, a reference image that indicates a selected image for printing. Specifically, the second setting module 242b generate reference image data representing the reference image, using image data for display which corresponds to RAW image data selected for printing, i.e. which is included in the same RAW image file as the RAW image data selected for printing.

In particular, the second setting module 242b in the present embodiment includes a display image data adjusting module 244. The display image data adjusting module 244 performs an adjustment process on the image data for display in order to adjust its tone characteristic (tone curve), and generate adjusted image data for display (reference image data).

The print data generating module 250 includes a developing process module 252 and a developed image processing module 254, and generates print data from original image data (either JPEG image data or RAW image data).

The developing process module 252 is used if printing is to be executed using RAW image data. The developing process module 252 performs a developing process on the RAW image data and generates developed image data in JPEG format (hereinafter termed "image data for printing"). As will be discussed later, the developing process module 252 carries out processes including an optical black correction process, a white balance correction process, an exposure correction process, a pixel interpolation process, a color reproduction process, an RGB-YUV conversion process, an edge sharpening process, a noise reduction process, a tone correction process, and a JPEG process.

The developed image processing module 254 generate print data using the developed image data, and supplies the print data to the print execution section 280. Specifically, if printing is to be executed using JPEG image data, the print data is generated using the JPEG image data. On the other hand, if printing is to be executed using RAW image data, the print data is generated using the developed image data in JPEG format (image data for printing) generated by the developing process module 252.

The developed image processing module 254 executes image processing of various kinds when generating the print data. This image processing may include, for example, a process for correcting brightness, a process for detecting the face of a human subject and correcting facial color, a process for correcting so-called red-eye. The developed image processing module 254 then executes a resolution conversion process, a color conversion process, and a halftoning process, and generate dot data (print data) representing dot formation status (dot on-off states), as well known. Note that, in the color conversion process, the color components of R (red), G (green), and B (blue) are converted to amounts of Y (yellow), M (magenta), C (cyan), and K (black) ink, and a prescribed tone correction is carried out. Printing is carried out according to variable density information of ink data.

B. PRINTING PROCESS

Figure 3:
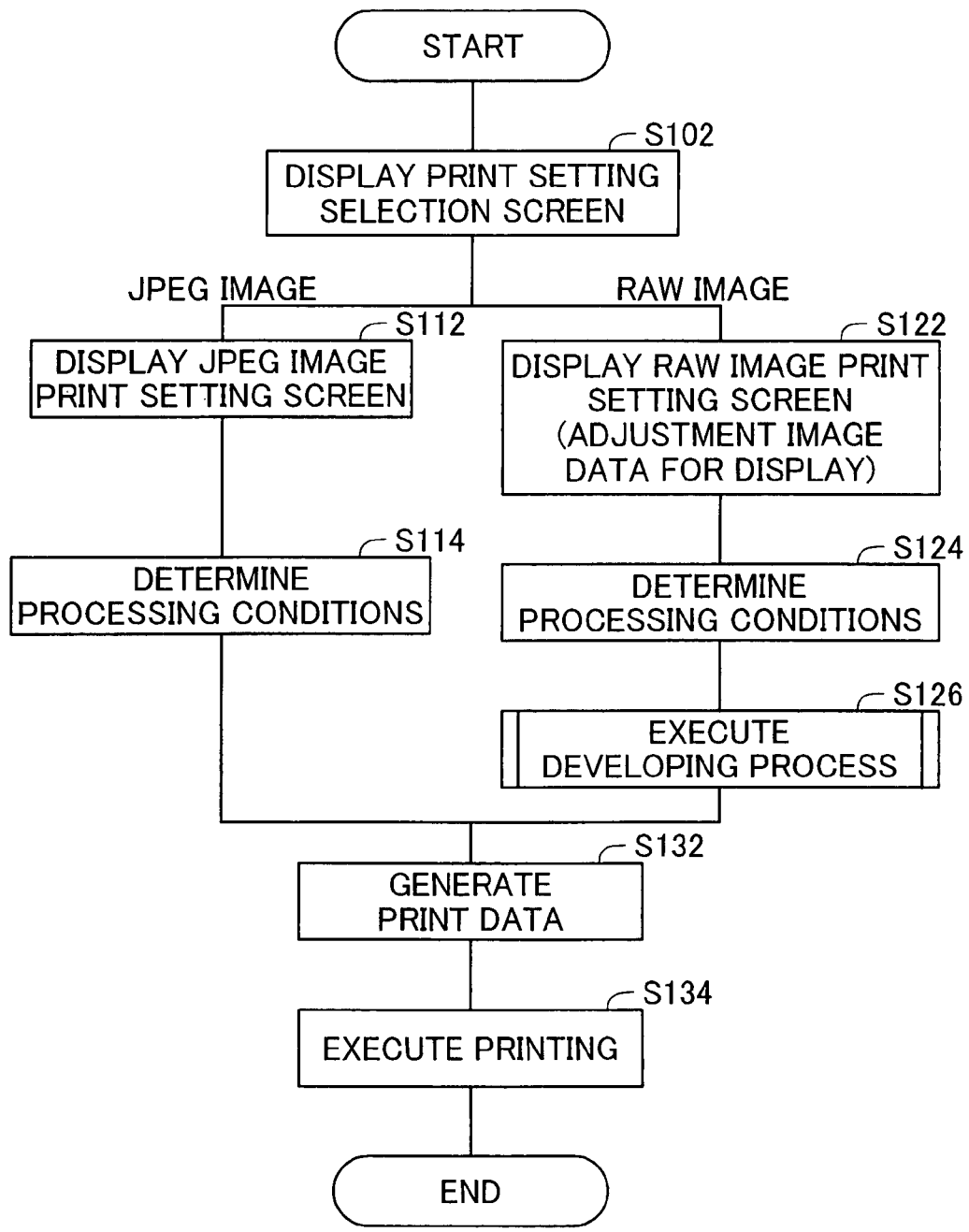
FIG. 3 is a flowchart showing a sequence of a printing process.

FIG. 3 is a flowchart showing a sequence of a printing process. In Step S102, the processing condition determining module 240 displays a print setting selection screen on the display panel 160 according to an instruction from the user. Note that the instruction is made by user operation of the operation section 270.

Figure 4:
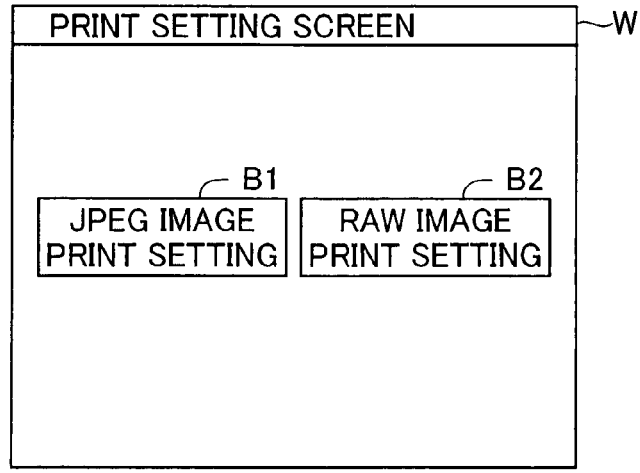
FIG. 4 shows a print setting selection screen W.

FIG. 4 shows a print setting selection screen W. As shown in FIG. 4, the selection screen W includes a "JPEG image print setting" selection button B1, and a "RAW image print setting" selection button B2. Note that the selection of button B1, B2 is made by user operation of the operation section 270.

If it is desired to print using JPEG image data, the user selects the "JPEG image print setting" selection button B1 on the selection screen W of FIG. 4. The routine then advances to Step S112.

In Step S112, the first setting module 242a of the processing condition determining module 240 displays a JPEG image print setting screen on the display panel 260.

Figure 5:
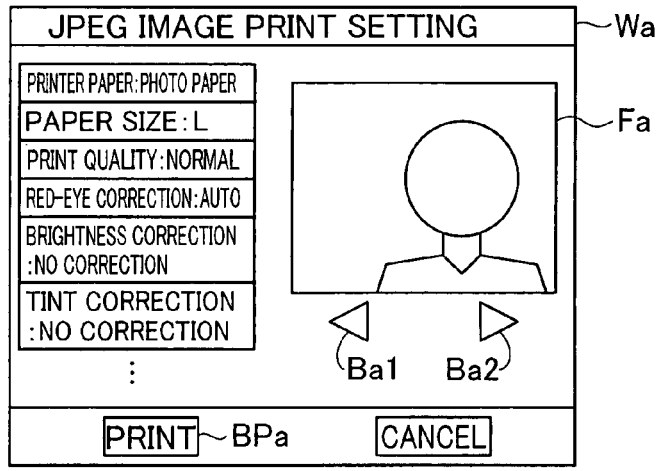
FIG. 5 shows a JPEG image print setting screen Wa.

FIG. 5 shows a JPEG image print setting screen Wa. As shown in FIG. 5, the setting screen Wa includes selection buttons Ba1, Ba2 for selecting an image for printing, a reference image display field Fa for displaying a reference image showing the selected image for printing, and a "Print" button BPa for issuing an instruction to execute printing. As noted, the reference image display field Fa displays image using reference image data obtained by reducing the JPEG image data. By operating the selection button Ba1, Ba2 while checking the reference images displayed in the reference image display field Fa, the user can select, as the image data for printing, desired JPEG image data from among a plurality of JPEG image data contained in a plurality JPEG image files that have been stored in the memory card MC.

In addition, the setting screen Wa includes various setting items for determining processing conditions for printing using JPEG image data. Specifically, the setting screen Wa includes an item "Printer Paper" for selecting types of printer paper, an item "Paper Size" for selecting the size of the printer paper, an item "Print Quality" for selecting print quality (either a high speed normal quality mode or low speed high quality mode), and an item "Red-eye Correction" for selecting whether to perform red-eye correction. The setting screen Wa also includes an item "Brightness Correction" for selecting whether to perform brightness correction and selecting the content thereof, and an item "Tint Correction" for correcting tint.

In the present embodiment, the content of item "Brightness Correction" can be set to any one of "No Correction," "Brighter," and "Darker", for example. In the present embodiment, the content of item "Tint Correction" can be set to any one of "No Correction," "Emphasize Reddish Tint," and "Emphasize Bluish Tint", for example. The setting screen Wa of FIG. 5 is designed on the assumption that the contents of items "Brightness Correction" and "Tint Correction" are set by the user, but these contents of items may be automatically set by means of image analysis processing.

In the setting screen Wa, JPEG image data is selected for printing, and contents of items are set by user operation of the operation section 270. The "Print" button BPa is then selected by the user.

In Step S114, the processing condition determining module 240 determines the processing conditions for printing using JPEG image data on the basis of the contents of setting items acquired by the first setting module 242a.

On the other hand, if it is desired to print using RAW image data, the user selects the "RAW image print setting" selection button B2 on the selection screen W of FIG. 4. The routine then advances to Step S122.

In Step S122, the second setting module 242b of the processing condition determining module 240 displays a RAW image print setting screen on the display panel 260.

Figure 6:
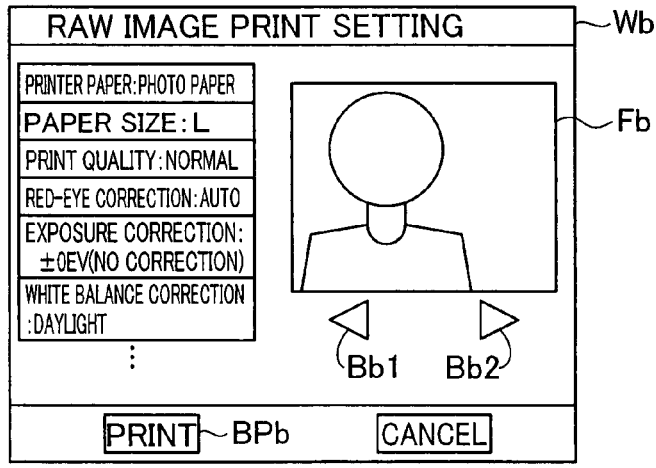
FIG. 6 shows a RAW image print setting screen Wb.

FIG. 6 shows a RAW image print setting screen Wb. As shown in FIG. 6, the setting screen Wb, like the setting screen Wa of FIG. 5, includes selection buttons Bb1, Bb2, a reference image display field Fb, and a "Print" button BPb. As noted, the reference image display field Fb displays image using adjusted image data for display (reference image data) obtained by performing adjustment of the image data for display. By operating the selection button Bb1, Bb2 while checking the reference images displayed in the reference image display field Fb, the user can select, as the image data for printing, desired RAW image data from among a plurality of RAW image data contained in a plurality of RAW image files that have been stored in the memory card MC.

In addition, the setting screen Wb, like the setting screen Wa of FIG. 5, includes various setting items for determining processing conditions for printing using RAW image data. However, the setting screen Wb includes, instead of the items of "Brightness Correction" and "Tilt Correction", an item "Exposure Correction" for selecting whether to perform exposure correction and selecting the extent thereof, and an item "White Balance Correction" for correcting white balance.

In the present embodiment, the content of item "Exposure Correction" can be set to any one of "±0 EV (no correction)," "+0.5 EV," "+1.0 EV," "+1.5 EV," "+2.0 EV," "−0.5 EV," "−1.0 EV," "−1.5 EV," and "−2.0 EV." The item "Exposure Correction" differs from the item "Brightness Correction" included in the setting screen Wa of FIG. 5. The item "Exposure Correction" is an item for performing an exposure correction process similar to the exposure correction process performed in the camera. It is difficult to perform this exposure correction process on JPEG image data. By means of this exposure correction process, it is possible to correct a fairly dark image or a fairly light image to an image of appropriate brightness, which is extremely useful to the user. In the present embodiment, the content of item "White Balance Correction" can be set to any one of "Daylight," "Cloudy," "Shady," "Incandescent," "Fluorescent" and other illuminants. The initial value for the item "White Balance Correction" is set to the white balance setting value (e.g. daylight) described in the header portion of the RAW image file. The user can then change the type of illuminant if it is desired to change the white balance. Alternatively, the content of item "White Balance Correction" may be indicated color temperature (e.g. "3000 K," "4500 K," "5500 K," "6500 K," "7500 K" etc.) instead of types of illuminant.

In the setting screen Wb, RAW image data is selected for printing, and contents of items are set by user operation of the operation section 270. The "Print" button BPb is then selected by the user.

In Step S124, the processing condition determining module 240 determines the processing conditions for printing using RAW image data on the basis of the contents of setting items acquired by the first setting module 242b.

In Step S126, the developing process module 252 performs a developing process on the RAW image data according to the processing conditions determined in Step S124, and generates developed image data (image data for printing). Specifically, as will be discussed later, in Step S126 the RAW image data is subjected to a series of processes including an optical black correction process, a white balance correction process, an exposure correction process, a pixel interpolation process, a color reproduction process, an RGB-YUV conversion process, an edge sharpening process, a noise reduction process, a tone correction process, and a JPEG process. The white balance correction process is a process for multiplying the R data and B data among the R (red), G (green), and B (blue) data by coefficients Ar and Ab, respectively. The pixel interpolation process is a process for inferring and interpolating missing color information caused by the Bayer arrangement of color filters disposed on an image sensor. The color reproduction process is a process for reproducing image color accurately by means of a 3×3 matrix operation. The RGB-YUV conversion process is a color space conversion process for carrying out the JPEG process. The edge sharpening process is a process for correcting and sharpening areas of blurred contours in an image due to an optical low pass filter installed in the camera. The noise reduction process is a process for reducing noise components present in an image to create a clear image. The tone correction process is a process for correcting a tone reproduction characteristic to conform to a tone characteristic of a device that prints an image (i.e. printer).

If the item "Exposure Correction" in FIG. 6 is set to "±1.0 EV," subsequent to the white balance correction process, an exposure correction process involving multiplying the R, G, and B data by a coefficient that corresponds to +1.0 EV is performed. Since "+1.0 EV" indicates a process for increasing the exposure brightness by one step, a process to multiply the R, G, and B data by 2 is performed. In the case of "−0.5 EV", the coefficient for multiplication is $1/\sqrt{2}(=0.707)$. Further, if the type of illuminant is specified for the item "White Balance Setting" of FIG. 6, a white balance correction process involving multiplying the R, G, and B data by predetermined coefficients is performed according to the type of illuminant, e.g. "Daylight," "Cloudy," "Shady," "Incandescent," "Fluorescent" and so on.

In Step S132, the developed image processing module 254 generates the print data. Specifically, if printing is to be executed using JPEG image data, the developed image processing module 254 performs processing on the JPEG image data according to the processing conditions determined in Step S114, and generate the print data. On the other hand, if printing is to be executed using RAW image data, the developed image processing module 254, in accordance with the processing conditions determined in Step S114, performs processing on the developed image data (image data for printing) that has been subjected to the developing process in Step S126, and generate the print data.

In Step S134, the print execution section 280 acquires the print data from the developed image processing module 254 and prints the image onto the printer paper.

Figure 7:
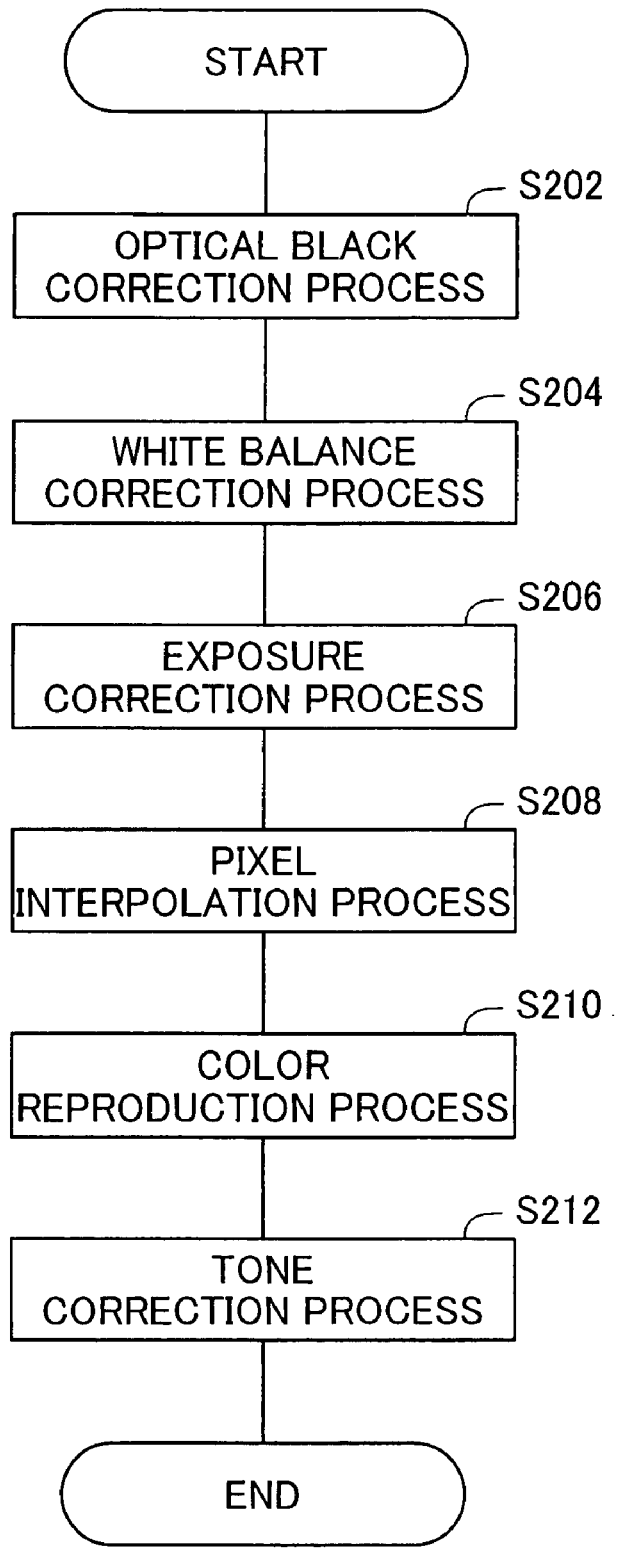
FIG. 7 is a flowchart showing an exemplary sequence of the developing process executed in Step S126 of FIG. 3.

FIG. 7 is a flowchart showing an exemplary sequence of the developing process executed in Step S126 of FIG. 3.

In Step S202, the developing process module 252 executes an optical black correction process. This process is used to correct a characteristic of the camera's image sensor, specifically, to correct the characteristic that sensor value does not become zero when the intensity of incident light is zero. This process involves subtracting an offset value from a tone value of each pixel included in the RAW image data.

Note that the process of Step S202 is carried out, for example, with reference to the manufacturer and model described in the header portion of the RAW image file. Specifically, the processing condition determining module 240 analyzes the header portion of the RAW image file and acquires the manufacturer and model. The processing condition determining module 240 includes a table (not shown) in which a plurality of combinations of manufacturer and model with processing conditions are registered. The processing condition determining module 240 looks up the acquired manufacturer and model in the table, and selects corresponding processing conditions. The developing process module 252 then executes the process of Step S202, using the selected processing conditions. Note that if processing conditions are described in the header portion, the processing conditions may be used as well.

In Step S204, the developing process module 252 executes a white balance correction process for correcting white balance (color temperature). This process involves multiplying a tone value of each pixel by a coefficient that correspond to the target white balance, for each of R, G, and B data constituting the RAW image data on which the process of Step S202 has been performed. More specifically, the process involves multiplying the R data and B data among the R (red), G (green), and B (blue) data by the coefficients Ar and Ab, respectively.

Note that the process of Step S204 is executed according to the content of item "White Balance Correction" of the RAW image print setting screen Wb (FIG. 6). As mentioned previously, the content of item is the same as the white balance setting value described in the header portion of the RAW image file, if the content of item has not been changed from its initial value. If the content of item "White Balance Correction" has been selected by the user from the setting screen of FIG. 6, the R, G, B data are multiplied by predetermined coefficients according to the selected type of illuminant, e.g. "Daylight," "Cloudy," "Shady," "Incandescent," "Fluorescent".

In Step S206, the developing process module 252 executes an exposure correction process for correcting the exposure. This process involves multiplying the tone values of the pixels contained in the image data that has undergone the process of Step S204 by a coefficient that depends on the level of exposure correction, Note that the process of Step S206 is executed according to the content of item "Exposure Correction" of the RAW image print setting screen Wb (FIG. 6). If the item "Exposure Correction" is set to anything other than "±0 EV (no correction)," e.g. if it is set to "±1.0 EV," subsequent to the white balance correction process, the exposure correction process involving multiplying the R, G, and B data by a coefficient that corresponds to ±1.0 EV is performed. As mentioned previously, since "±1.0 EV" indicates a process for increasing the exposure brightness by one step, a process to multiply the R, G, and B data by 2 is performed. In the case of "−0.5 EV" the coefficient for multiplication is $1/\sqrt{2}(=0.707)$. However, if the content of item "Exposure Correction" is set to "±0 EV (no correction)," the process of Step S206 is skipped.

In Step S208, the developing process module 252 executes a pixel interpolation process (specifically, a demosaicing process). The pixel interpolation process is a process for interpolating pixels that are missing due to the arrangement of a plurality of sensor elements in the camera's image sensor. In an image sensor employing RGB primary color filters, due to the Bayer arrangement of the color filters on the sensor, each pixel is either R, G, or B. If a given pixel is an R pixel, G and B information is lacking for that location. If a given pixel is a G pixel, R and B information is lacking for that location. The pixel interpolation process is a process for inferring and interpolating this missing color information from color information of surrounding pixels. In this process, tone values for interpolated pixels (missing color components) are determined, for each of R, G, and B data constituting the image data on which the process of Step S206 has been performed.

Note that the process of Step S208, like that of Step S202, may be executed utilizing processing conditions that are selected according to the manufacturer and model described in the header portion of the RAW image file, or executed utilizing processing conditions described in the header portion.

In Step S210, the developing process module 252 executes a color reproduction process. Since the RGB spectral characteristics of image sensor differ from the spectral characteristics of human eye, accurate color reproduction cannot be achieved simply by synthesizing the color output of the image sensor. The color reproduction process is a process for correcting color so as to match the characteristics of the human visibility. The process is carried out by means of a 3×3 matrix operation to accurately reproduce image color.

In Step S212, the developing process module 252 executes a tone correction process (gamma correction process) for correcting a tone characteristic. By means of this process, a linear tone characteristic of image data prior to the process is corrected to a tone characteristic matching an output tone characteristic of the printer 200.

Note that the developing process module 252 also executes an edge sharpening process and a noise reduction process in addition to Steps S202-S212 shown in FIG. 7. The edge sharpening process is a process for correcting and sharpening areas of blurred contours in an image due to an optical low pass filter installed in the camera. The noise reduction process is a process for reducing noise components present in an image to create a clear image. Further, the developing process module 252 finally generates a developed image data in JPEG format (image data for printing). As discussed previously, the JPEG-compressed developed image data is generated in the present embodiment, but instead of this, developed image data that is not JPEG-compressed may be generated.

C. EXPOSURE CORRECTION PROCESS

If the item "Exposure Correction" included in the RAW image print setting screen Wb (FIG. 6) is set to a significant value (i.e. a value other than "no correction"), the exposure correction process is carried out on the RAW image data. The exposure correction process is executed by the developing process module 252 in Step S126 of FIG. 3 (more specifically, Step S206 of FIG. 7). On the other hand, if the item "Brightness Correction" included in the JPEG image print setting screen Wa is set to a significant value (i.e. a value other than "no correction"), the brightness correction process is carried out on the JPEG image data. The brightness correction process is executed by the developing process module 252 in Step S132 of FIG. 3.

A feature common to the exposure correction process and the brightness correction process is that they modify the brightness of image to be printed (or printed image). However, as discussed below, the exposure correction process and the brightness correction process are completely different processes.

Figure 8:
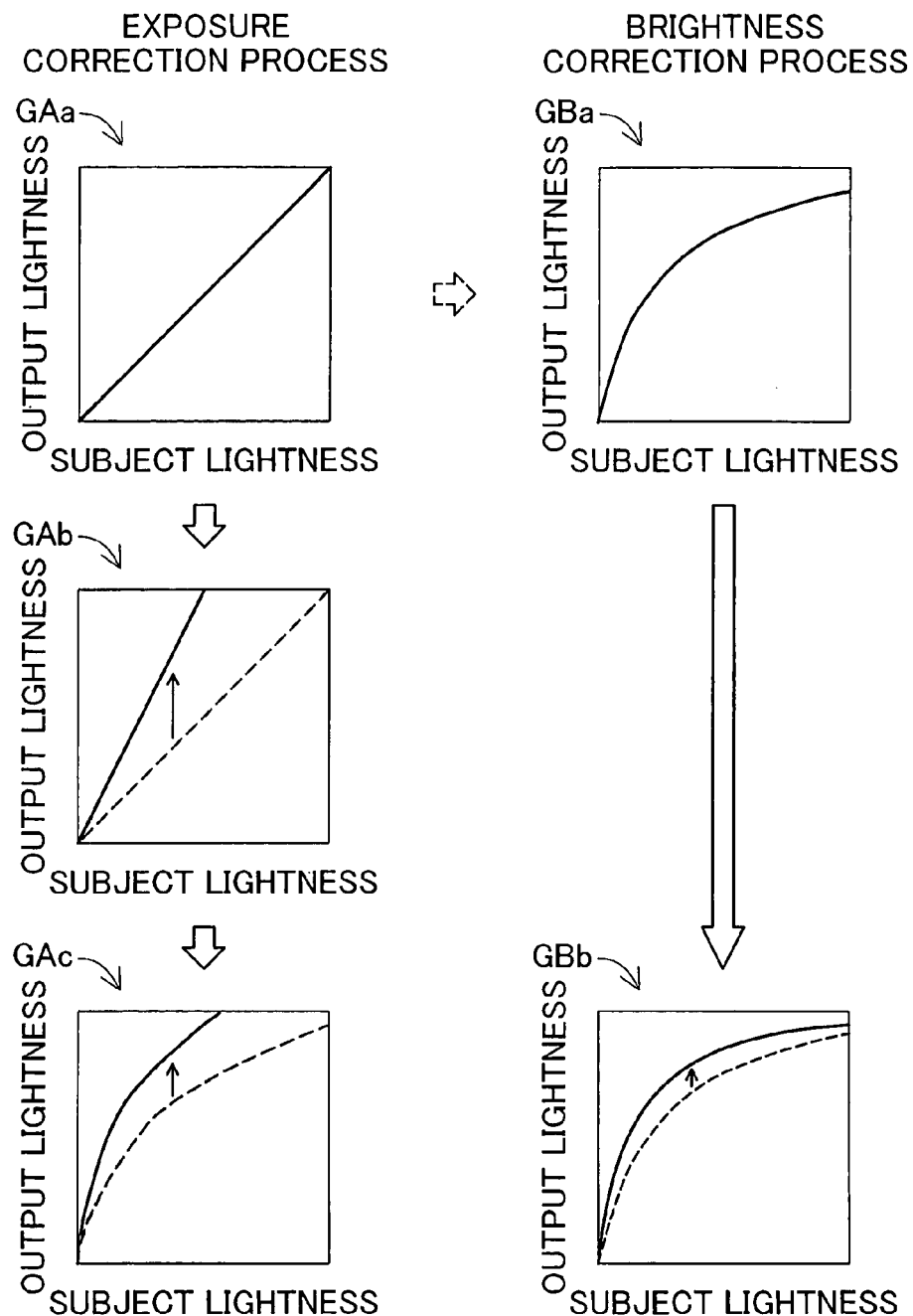
FIG. 8 shows contents of the exposure correction process and contents of the brightness correction process.

FIG. 8 shows contents of the exposure correction process and contents of the brightness correction process. FIG. 8 depicts five graphs GAa, GAb, GAc, GBa, GBb, and these five graphs represent tone characteristics of five image data. The horizontal axis of each graph indicates a lightness of a subject. The vertical axis indicates an output lightness of the image data, that is, the lightness (tone value) of the subject represented by each image data. The three graphs GAa, GAb, GAc depicted in the left side of FIG. 8 show the contents of the exposure correction process, while the two graphs GBa, GBb depicted in the right side of FIG. 8 show the contents of the brightness correction process.

The graph GAa shows the tone characteristic of RAW image data. As shown by graph GAa, regarding the RAW image data, the lightness (tone value) of the image data varies in linear fashion with respect to the lightness of the subject. This is because the RAW image data is generated in the camera by analog-to-digital conversion of output of the image sensor as-is.

The graph GAc shows the tone characteristic of developed image data (image data for printing) obtained after a developing process including an exposure correction process. As shown by graph GAc, regarding this image data, the output lightness (tone value) varies in non-linear fashion with respect to the lightness of the subject. This is because a tone correction process (Step S212 of FIG. 7) is executed in the developing process by the printer 200. Note that a broken line in graph GAc shows a tone characteristic of developed image data (image data for printing) in the event that the exposure correction process is omitted (i.e. in the absence of an exposure correction process).

The graph GAb shows the tone characteristic of intermediate image data obtained in the course of performing the developing process on RAW image data. More specifically, the graph GAb shows the tone characteristic of intermediate image data obtained subsequent to the "±1.0 EV" exposure correction process (Step S206 of FIG. 7). As shown by the graph GAb, regarding this image data, the output lightness (tone value) still varies in linear fashion with respect to the lightness of the subject. Note that a broken line shown in the graph GAb shows a tone characteristic of intermediate image data in the event that the exposure correction process is omitted. As shown in the drawing, the gradient of the broken line in the graph GAb is double the gradient of the solid line in the graph GAb. In this way, the "±1.0 EV" exposure correction process is a process involving multiplication by a factor of 2.

The graph GBa shows the tone characteristic of JPEG data. As shown in the graph GBa, regarding JPEG data, the output lightness (tone value) varies in non-linear fashion with respect to the lightness of the subject. This is because the tone correction process (gamma correction process) similar to that of Step S212 of FIG. 7 has been executed during the JPEG image generation process (developing process) in the camera.

The graph GBb shows the tone characteristic of JPEG data obtained subsequent to the brightness correction process. As shown in the graph GBb, regarding this image data, the output lightness (tone value) varies in non-linear fashion with respect to the lightness of the subject. Note that a broken line in the graph GBb shows a tone characteristic identical to the tone characteristic of the graph GBa. The characteristic represented by the solid line is corrected so as to make output lightness brighter in comparison with the characteristic represented by the broken line in the middle range of the subject lightness.

As will be apparent from comparison of the two graphs GAc, GBb, the tone characteristic of developed image data (image data for printing) obtained after exposure correction is completely different from the tone characteristic of JPEG image data obtained after brightness correction. This is because, in the exposure correction process, correction is carried out by multiplying a coefficient by tone values of pixels of image data having linear tone characteristic as shown in the graph Gab, whereas in the brightness correction process, correction is typically carried out by performing an exponential operation on tone values of the pixels of JPEG image data having non-linear tone characteristics as shown in the graph GBb. That is, in the brightness correction process, a process is typically carried out to increase brightness in the middle range of image lightness, and the characteristic of the solid line in the graph GBb is derived by carrying out an exponential operation $Y=X^{1/a}$ on the characteristic of the graph GBa. Thus, where the exposure correction process is performed, the result is the same as that where exposure is corrected at the time of shooting, but where the brightness correction process is performed, the result is not the same as that where exposure is corrected at the time of shooting.

JPEG image data has non-linear tone characteristics, and in JPEG image data, tone values of pixels are represented with 8 bits. Thus, if the brightness correction process is executed so as to avoid degrading picture quality, brightness correction is limited to the equivalent of between +0.5 and −0.5 EV. Specifically, the extent of the correction is such as to allow a flawed photograph of somewhat insufficient brightness or of a flawed photograph of somewhat excessive brightness to be corrected to a photograph of normal brightness. If brightness correction is performed outside of this range, jumping of tones, referred to as tone jump, may occur in a specified tone range of 8-bit JPEG image data, causing tone to vary unnaturally instead of varying smoothly and resulting in an inability to obtain an attractive image. RAW image data, on the other hand, has linear tone characteristics, and in RAW image data, tone values of pixels are represented with 12 bits. In particular, in the present embodiment, the developing process module 252 performs a developing process that increases the bits representing tone values of the pixels of the RAW image data, from 12-bit to 16-bit accuracy. Accordingly, in the present embodiment, exposure correction between +2.0 and −2.0 EV is possible without any degradation of picture quality.

In the present embodiment discussed above, the RAW image print setting screen Wb (FIG. 6) includes the item "Exposure Correction" that is not included in the JPEG image print setting screen Wa (FIG. 5). Accordingly, if printing is to be executed using RAW image data, print data can be easily generated from the RAW image data by means of executing a developing process that includes an exposure correction process corresponding to the item "Exposure Correction", in other words, by means of executing a developing process that includes an exposure correction process not possible to execute where printing is to be executed using JPEG image data (i.e. an exposure correction process substantially the same as that performed in the camera during shooting).

Note that in FIG. 8, the difference between the item "Exposure Correction" (FIG. 6) and the item "Brightness Correction" (FIG. 5) is described, and this is similar to the difference between the item "White Balance Correction" (FIG. 6) and the item "Tint Correction" (FIG. 5). Specifically, if the type of illuminant is set for the item "White Balance Correction", the tone values of the pixels is multiplied by a coefficient corresponding to the target white balance, for each R, G, and B data which constituting RAW image data having linear tone characteristic. On the other hand, if the "Tint Correction" is modified, a different operation process (e.g. an exponential operation) is performed on the tone values of the pixels, for each R, G, and B data constituting JPEG image data having non-linear tone characteristic.

Note that, in the present embodiment, the JPEG image print setting screen Wa (FIG. 5) includes the item "Brightness Correction" and the item "Tint Correction", however these items may be omitted.

In the present embodiment, the item corresponding to the exposure correction process is named "Exposure Correction", but may have some other name instead (e.g. "Brightness Correction" or "EV Correction"). Similarly, in the present embodiment, the item corresponding to the white balance correction process is named "White Balance Correction", but may have some other name instead (e.g. "Tint Correction").

As will be apparent from the preceding discussion, the JPEG image print setting screen Wa (FIG. 5) in the present embodiment corresponds to a first setting screen in the present invention, and the RAW image print setting screen Wb (FIG. 6) corresponds to a second setting screen. The item "Exposure Correction" and the item "White Balance Correction" correspond to a specific item in the present invention, respectively. The exposure correction process and the white balance correction process correspond to a specific process in the present invention, respectively.

In particular, in the present embodiment, a reference image is displayed in the reference image display field Fb of the RAW image print setting screen Wb (FIG. 6), and by checking this reference image, the user can quickly ascertain the subject represented by the RAW image data selected for printing, prior to executing the time-consuming developing process on the RAW image data, in other words, without waiting for completion of the developing process. That is, it is not necessary to wait for a very time-consuming series of developing process to be performed on the RAW image data in order to generate image data for display. As a result, the user can quickly select RAW image data to be printed.

D. ADJUSTMENT OF IMAGE DATA FOR DISPLAY

As mentioned earlier, in the present embodiment, the reference image is displayed in the reference image display field Fb of the RAW image print setting screen Wb (FIG. 6) is created using image data for display that is contained in the RAW image file.

In terms of the need of the user to be able to select an image of appropriate brightness for printing from among a plurality of images, it is preferable for tone reproduction (brightness of areas of the image) of reference image displayed on the display panel 260 and the tone reproduction (brightness of areas of the image) of image printed by the printer 200 (printed image) to appear substantially the same, in other words, to be recognized substantially the same by the user.

However, in actual practice, it is difficult to make it so that reference image brightness and printed image brightness give the same impression. A first cause of this problem is that the characteristics of devices differ (e.g. a displayed image is shown by means of a light-emitting display panel, whereas a printed matter is printed by a printer and is shown by reflected light). However, such differences among devices can be eliminated through a color matching process. A second cause of the problem lies in difference between the tone characteristic of the image data for display included in the RAW image file, and the tone characteristic of developed image data (image data for printing) obtained through the tone correction process of Step S212. Such difference in tone characteristics is due to the fact that image data for display is image data obtained by performing a developing process (specifically, a tone correction process) recommended by the camera manufacturer, whereas the developed image data (image data for printing) obtained from RAW image data in the printer 200 is obtained by performing a developing process (specifically, a tone correction process) recommended by the printer manufacturer. As noted, since tone characteristic Differ, even if a displayed image and a printed matter are given similar appearance through color matching technology, the brightness characteristics of the displayed image and the printed matter may be recognized different by the user.

Assuming that an image displayed on the display panel 260 has been created using developed image data (image data for printing) generated by the printer 200, it is possible to make the user perceive the brightness of the reference image and the brightness of the printed image as being substantially the same. However, the process of generating image data for printing, in other words, the developing process of RAW image data, is a time-consuming one. Thus, in the present embodiment, in order to meet the user's desire to be able to view images quickly, if printing is to be executed using RAW image data, the reference image is displayed on the display panel 260 using the image data for display, prior to the developing process. However, in this case, as discussed above, there may arise the problem that the brightness of the displayed image and the brightness of the printed image are recognized different by the user. Accordingly, it is an object of the present embodiment to address this problem and meet the need of the user to be able to select an image of appropriate brightness from among multiple images and print the image in the manner desired. It is another object to meet the need of the user to be able to perform exposure correction of an image to an appropriate brightness level and print out the image while viewing the display panel, rather than having to print out the image, in order to determine the proper setting for the exposure correction.

Figure 9:
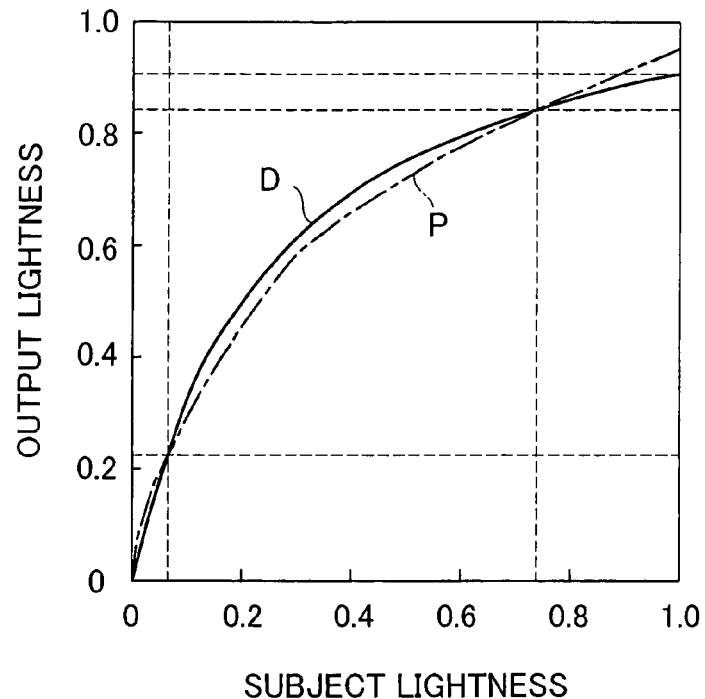
FIG. 9 shows tone characteristic P of image data for printing and tone characteristic D of image data for display.

FIG. 9 shows tone characteristic P of image data for printing and tone characteristic D of image data for display. The discussion assumes an instance in which RAW image data of a particular camera manufacturer is being printed by the printer 200 of the present embodiment. The tone characteristic P of the image data for printing (shown by a dashed line in FIG. 9) refers to the characteristic of the developing process (specifically, the tone correction process) of the developing process module 252. The tone characteristic D of the image data for display (shown by solid line in FIG. 9) refers to the characteristic of the developing process (specifically, the tone correction process) in the camera. As in FIG. 8, the horizontal axis in FIG. 9 indicates the lightness of the subject, in other words, the lightness (tone value) of the subject represented by the RAW image data (more specifically, where the exposure correction process of Step S206 of FIG. 7 is not executed, the image data prior to performing the tone correction process of Step S212 of FIG. 7). The vertical axis indicates output lightness of image data, specifically, the lightness (tone value) of the subject represented by image data for printing or image data for display.

In FIG. 9, the subject lightness (lightness of RAW image data) indicates tone value where a value of 1.0 is assigned to the maximum tone value that RAW image data can assume (e.g. 4095 in 4096 tones), and the output lightness indicates tone value where a value of 1.0 is assigned to the maximum tone value that image data can assume (e.g. 255 in 256 tones).

The tone characteristic D of the image data for display is a tone correction characteristic prepared in the camera by the camera manufacturer, and differs from the tone characteristic P of the image data for printing, as shown in FIG. 9. From FIG. 9 it is apparent that the output lightness of image data for printing is greater than the output lightness of image data for display within a subject lightness range of below about 0.05 and above about 0.7, but less than the output lightness of image data for display within a subject lightness range of between about 0.05 and 0.07.

As noted, if the two tone characteristics P and D differ in this way, the user recognize brightness of the printed image and brightness of the reference image to be different. Accordingly, in the present embodiment, brightness of the printed image and brightness of the reference image are manipulated in such a way as to be recognized substantially the same by the user, thereby providing the convenience of being able to directly confirm brightness of the printed image when actually printed.

Specifically, in the present embodiment, the display image data adjusting module 244 adjusts the image data for display such that the tone characteristic D of the image data for display is brought into approximation with the tone characteristic P of the image data for printing. The adjustment process is performed during display of the reference image in the reference image display field Fb of the RAW image print setting screen Wb (FIG. 6), in Step S122 of FIG. 3.

However, tone characteristic D of the image data for display is dependent upon the type of camera which created the image data for display, and specifically on the developing process (more specifically the tone correction process) of the camera. Thus, in the present embodiment, a processing condition for the adjustment process varies depending on the type of camera. Specifically, the display image data adjusting module 244 analyzes the header portion of the RAW image file which contains the image data for display, and acquires the manufacturer and model. The display image data adjusting module 244 has a table (not shown) in which a plurality of combinations of manufacturer and model with processing conditions are registered. The display image data adjusting module 244 looks up the acquired manufacturer and model in the table, and selects the corresponding processing condition. The display image data adjusting module 244 then executes the adjustment process using the selected processing condition. In this way, the adjustment process can be carried out appropriately, depending on the tone characteristic of image data for display that may differ depending on the type of camera.

Various methods may be given by way of examples of the adjustment process. Three such methods are described hereinbelow, on the assumption that RAW image file containing image data for display is created by specific type of camera.

D-1. First Adjustment Method

In a first adjustment method, the display image data adjusting module 244 performs adjustment process of image data for display on the basis of Expression (1) below, to generate adjusted image data for display.

$$Y = a \cdot X \tag{1}$$

Here, X denotes lightness of the image data for display, i.e. tone value prior to the adjustment process, and represents tone value where a value of 1.0 is assigned to the maximum tone value that the image data for display can assume. Y denotes lightness of the adjusted image data for display, i.e. tone value subsequent to the adjustment process, and represents tone value where a value of 1.0 is assigned to the maximum tone value that the adjusted image data for display can assume a is a positive value that varies depending on the type of camera. In the present embodiment, a is set to equal 0.95.

Figure 10:
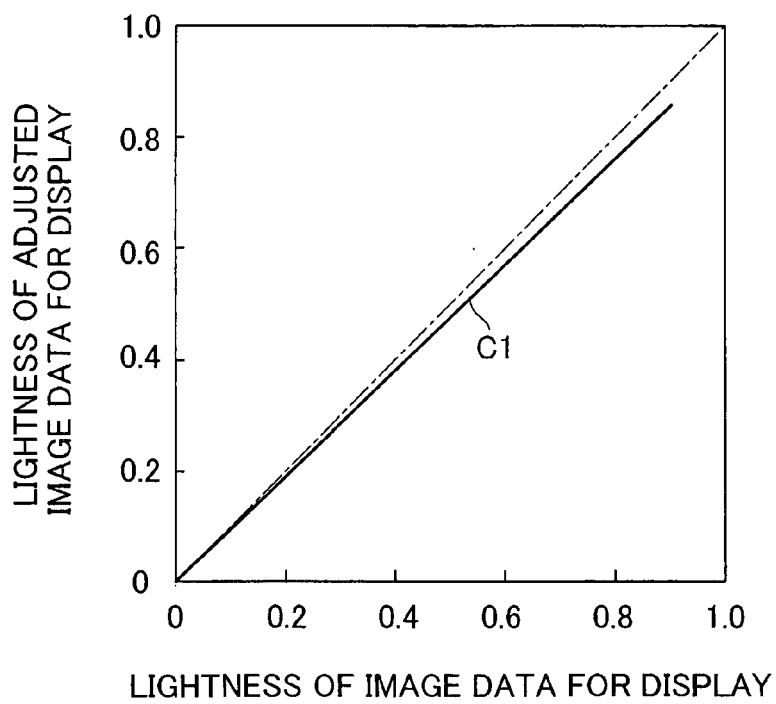
FIG. 10 shows the relationship between lightness of image data for display and lightness of adjusted image data for display, adjusted using the first adjustment method.

FIG. 10 shows the relationship between lightness of image data for display and lightness of adjusted image data for display, adjusted using the first adjustment method. Line C1 shown in FIG. 10 is represented by Expression (1) above. In FIG. 10, line Y=X is also shown by a dashed line, for reference. As will be apparent from line C1, with the first adjustment method, the lightness of the image data for display subsequent to the adjustment process will be reduced throughout the entire tone range. For example, pixels having lightness of 0.5 in the image data for display will have lightness of 0.475(=0.95×0.5) in the adjusted image data for display.

Note that, the maximum value for lightness of image data for display shown on the horizontal axis of FIG. 10 is about 0.9. This is because the maximum value of lightness of image data for display (output lightness) shown on the vertical axis in FIG. 9 is about 0.9.

Figure 11:
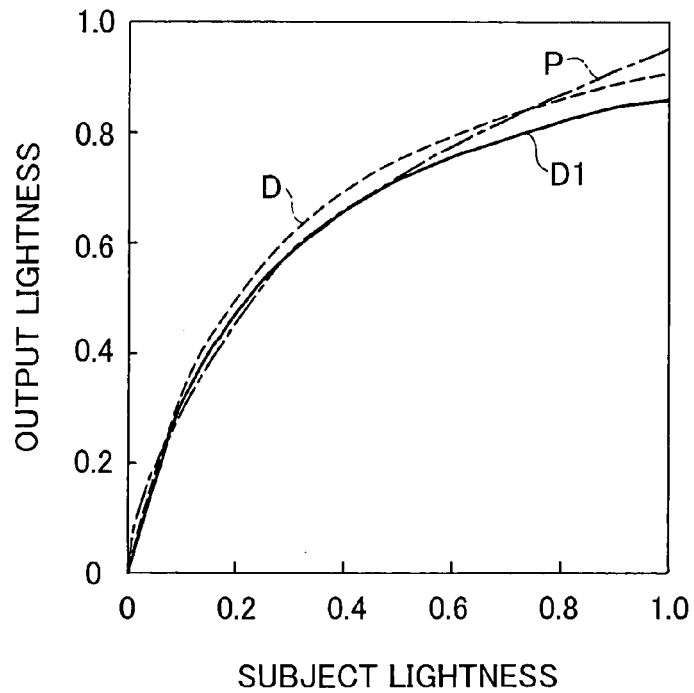
FIG. 11 shows tone characteristic D1 of adjusted image data for display, adjusted using the first adjustment method.

FIG. 11 shows tone characteristic D1 of adjusted image data for display, adjusted using the first adjustment method. Note that in FIG. 11, the two tone characteristics P, D shown in FIG. 9 are depicted as well.

From the tone characteristic D1 of the adjusted image data shown in FIG. 11, it will be apparent that, subsequent to the adjustment process, the tone characteristic D of the image data for display will be brought into approximation with the tone characteristic P of the image data for printing within a subject lightness range of between about 0.05 and about 0.6.

If the first adjustment method is employed, brightness of reference image and brightness of printed image can be recognized substantially the same by the user, within the frequently-utilized middle tone region. Moreover, since the first adjustment method utilizes Expression (1), the adjustment process can be carried out quickly and easily.

D-2. Second Adjustment Method

In a second adjustment method, the display image data adjusting module 244 performs adjustment process of image data for display on the basis of Expression (2) below, to generate adjusted image data for display.

$$Y = b \cdot X^c \quad (2)$$

Here, b and c are positive values that vary depending on the type of camera. In the present embodiment, b is set to equal 1.05 and c is set to equal 1.2.

Figure 12:
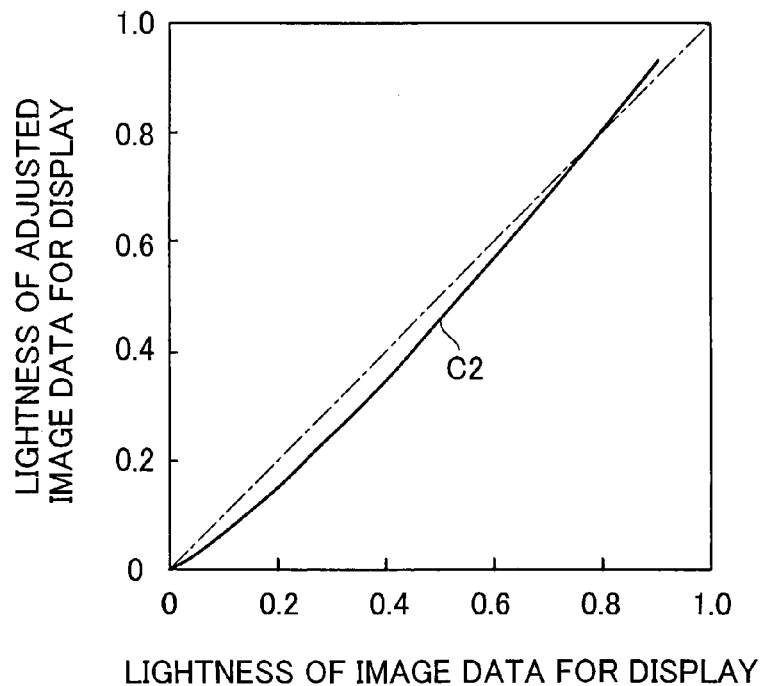
FIG. 12 shows the relationship between lightness of image data for display and lightness of adjusted image data for display, adjusted using the second adjustment method.

FIG. 12 shows the relationship between lightness of image data for display and lightness of adjusted image data for display, adjusted using the second adjustment method. Line C2 shown in FIG. 12 is represented by Expression (2) above. As will be apparent from line C2, with the second adjustment method, the lightness of the image data for display subsequent to the adjustment process will be reduced within a relatively low tone range, and will be increased within a relatively high tone range. For example, pixels having lightness of 0.5 in the image data for display will have lightness of about 0.457(=1.05×(0.5)$^{1.2}$) in the adjusted image data for display, while pixels having lightness of 0.9 in the image data for display will have lightness of about 0.925(=1.05×(0.9)$^{1.2}$) in the adjusted image data for display.

Figure 13:
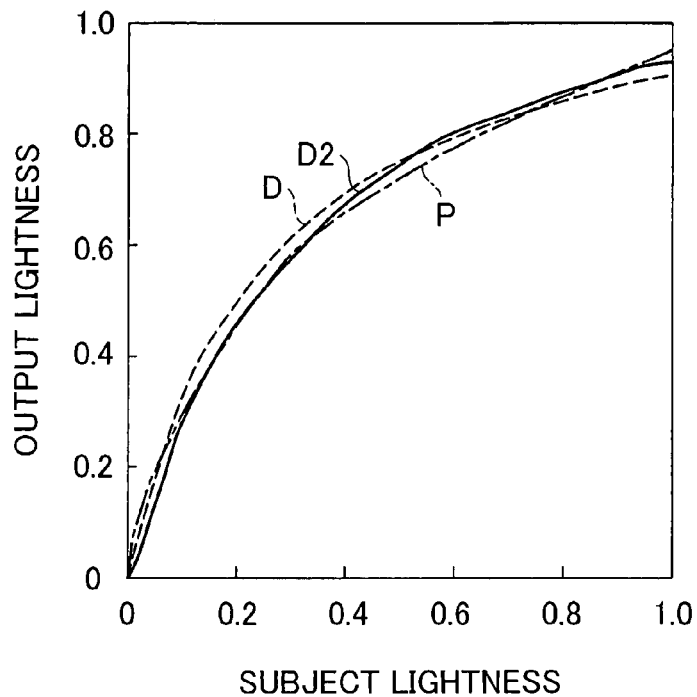
FIG. 13 shows tone characteristic D2 of adjusted image data for display, adjusted using the second adjustment method.

FIG. 13 shows tone characteristic D2 of adjusted image data for display, adjusted using the second adjustment method. Note that in FIG. 13, the two tone characteristics P, D shown in FIG. 9 are depicted as well.

From the tone characteristic D2 of the adjusted image data shown in FIG. 13, it will be apparent that, subsequent to the adjustment process, the tone characteristic D of the image data for display will be considerably brought into approximation with the tone characteristic P of the image data for printing, through a wide subject lightness range of 0.1 and above.

If the second adjustment method is employed, brightness of reference image and brightness of printed image can be recognized substantially the same by the user, from the middle tone to bright regions. Moreover, since the second adjustment method utilizes Expression (2), the adjustment process can be carried out quickly and easily. By carrying out the adjustment process shown in FIG. 12 on the image data for display having the tone characteristic D shown in FIG. 9, it is possible to obtain the tone characteristic D2 shown in FIG. 13, whereby the user can perceive the characteristics of brightness of an image displayed on the display panel and brightness of a printed matter as being substantially the same.

D-3. Third Adjustment Method

In a third adjustment method, the display image data adjusting module 244 performs adjustment process of the image data for display utilizes a LUT (lookup table), not shown, to generate adjusted image data for display.

Figure 14:
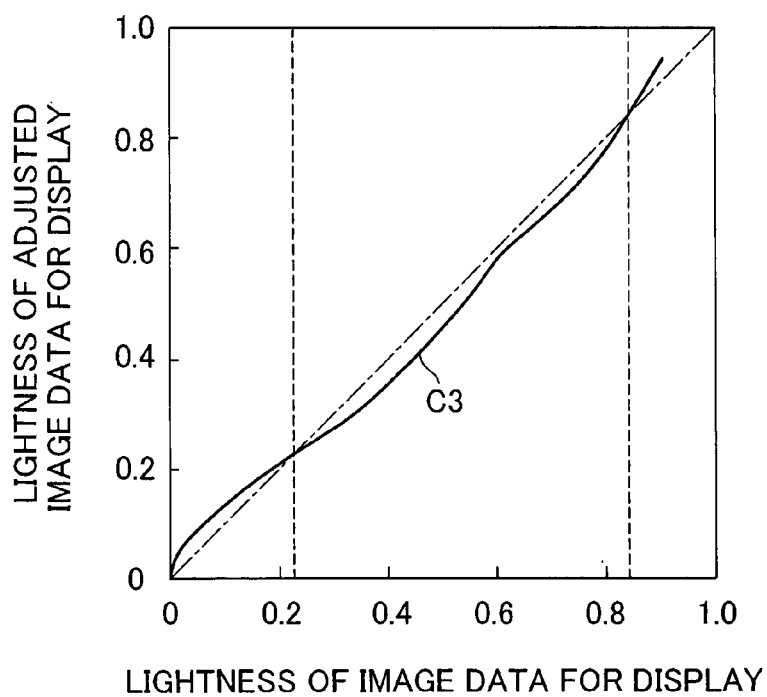
FIG. 14 shows the relationship between lightness of image data for display and lightness of adjusted image data for display, adjusted using the third adjustment method.

FIG. 14 shows the relationship between lightness of image data for display and lightness of adjusted image data for display, adjusted using the third adjustment method. The relationship indicated by the curve C3 shown in FIG. 14 is registered in the LUT.

As will be apparent from the curve C3, with the third adjustment method, the lightness of image data for display subsequent to the adjustment process will be increased in tone ranges of below about 0.2 and above about 0.85, while be reduced in a tone range of between about 0.2 and about 0.85. The relationship shown in FIG. 14 is established on the basis of the relationship of the two tone characteristics P, D shown in FIG. 9. Specifically, in FIG. 9, output lightness of image data for display is less than output lightness of image data for printing, in ranges of below about 0.2 and above about 0.85 of output lightness of image data for display, while output lightness of image data for display is greater than output lightness of image data for printing, in range of between about 0.2 and about 0.85 of output lightness of image data for display. The relationship shown in FIG. 14 is established such that the relationship shown in FIG. 9 is modified, in other words, such that the tone characteristic D of image data for display matches the tone characteristic P of image data for printing.

Figure 15:
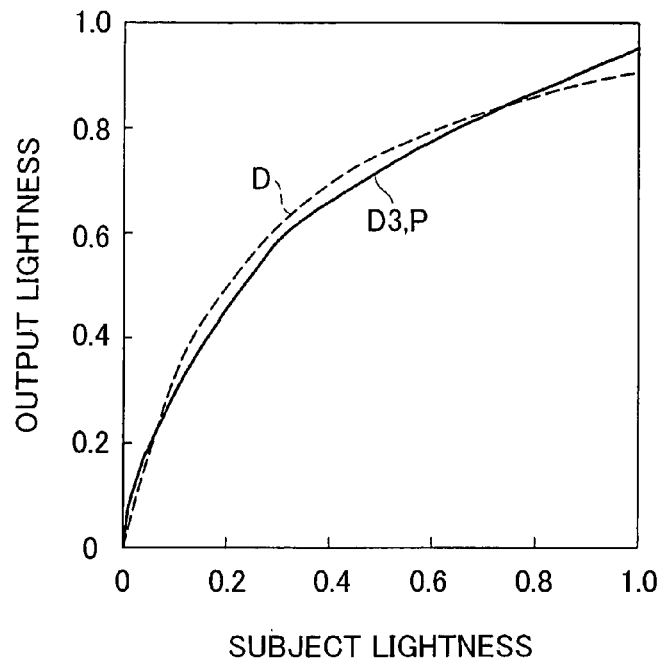
FIG. 15 shows tone characteristic D3 of adjusted image data for display, adjusted using the third adjustment method.

FIG. 15 shows tone characteristic D3 of adjusted image data for display, adjusted using the third adjustment method. Note that in FIG. 15, the two tone characteristics P, D shown in FIG. 9 are depicted as well.

From the tone characteristic D3 of the adjusted image data shown in FIG. 15, it will be apparent that, subsequent to the adjustment process, the tone characteristic D of image data for display will match the tone characteristic P of image data for printing over the entire range of subject lightness.

If the third adjustment method is employed, brightness of reference image and brightness of printed image can be recognized substantially the same by the user throughout the entire tone range. The user can perceive the characteristics of brightness of an image displayed on the display panel and brightness of a printed matter as being substantially the same.

As discussed above, in the present embodiment, the tone characteristic D of image data for display are adjusted, in such a way that the tone characteristic D of image data for display is brought into approximation with the tone characteristic P of image data for printing. Thus, by checking the reference image, the user can quickly ascertain the brightness of the printed image prior to executing a time-consuming developing process, in other words, without waiting for completion of the developing process. As a result, needless execution of printing can be avoided. Specifically, the user can select an image of appropriate brightness before instructing that printing begin, and thereby avoid needless execution of printing, e.g. to print a flawed photograph that is excessively bright or to print a flawed photograph that is excessively dark.

Note that, in the present embodiment, the color matching process for matching the brightness characteristic (tone characteristic) of a displayed image with the brightness characteristic (tone characteristic) of a printed matted is carried out in the display panel 260 of FIG. 1.

Herein, adjusting image data for display in such a way that "a tone characteristic of image data for display is brought into approximation with a tone characteristic of image data for printing" refers to adjusting the image data for display in such a way that, over at least a portion (e.g. the middle tone region) of the range of subject lightness (lightness of the RAW image data), a differential between the lightness of the adjusted image data for display and the lightness of the image data for printing is smaller than a differential between the lightness of the image data for display and the lightness of the image data for printing.

E. ADJUSTMENT OF IMAGE DATA FOR DISPLAY DEPENDING ON EXPOSURE CORRECTION LEVEL

By the way, it is preferable that, if the content of item "Exposure Correction" included in the RAW image print setting screen Wb (FIG. 6) is set to a significant value (i.e. a value other than "no correction") by the user, an image having brightness adjusted according to the level of exposure correction is displayed on the display panel 260. Also, it is preferable that, if the content of item "Exposure Correction" included in the setting screen Wb is set to the significant value by the user, the brightness of the reference image and the brightness of the printed image is recognized substantially the same by the user. By so doing, it is possible for the user to select an optimal exposure correction level while viewing the image in the reference image display field Fb of FIG. 6, thus considerably improving convenience for the user. Accordingly, the present embodiment is designed so that the brightness of the reference image and the brightness of the printed image having undergone exposure correction are recognized substantially the same by the user, if the exposure correction level is set to a significant value.

If the exposure correction level is set to a significant value, the developing process module 252 executes the exposure correction process in Step S206 (FIG. 7). As noted, in the exposure correction process, the tone values of the pixels included in the RAW image data are multiplied by a coefficient dependent on the exposure correction level.

Table 1 below shows relationship between exposure correction levels and coefficients for multiplication by RAW image data. As will be apparent from Table 1, if the exposure correction level is set to "nEV" (n is any one of +2.0, +1.5, +1.0, +0.5, ±0, −0.5, −1.0, −1.5, and −2.0), the coefficient is set to $2^n$. For example, if the exposure correction level is set to "+2.0 EV," the coefficient $4(=2^{+2.0})$ is multiplied by the tone values of the pixels included in the RAW image data.

TABLE 1

| EXPOSURE CORRECTION LEVEL | COEFFICIENT |
| --- | --- |
| +2.0EV | $4 (=2^{+2.0})$ |
| +1.5EV | $2.83 (=2^{+1.5})$ |
| +1.0EV | $2 (=2^{+1.0})$ |
| +0.5EV | $1.41 (=2^{+0.5})$ |
| ±0EV (no correction) | $1 (=2^0)$ |
| −0.5EV | $1/1.41 (=2^{-0.5})$ |
| −1.0EV | $1/2 (=2^{-1.0})$ |
| −1.5EV | $1/2.83 (=2^{-1.5})$ |
| −2.0EV | $1/4 (=2^{-2.0})$ |

Through an exposure correction process according to the exposure correction level based on Table 1, developed image data (image data for printing) according to the exposure correction level is generated (see FIG. 7). The developed image data (image data for printing) is generated by the series of processes of FIG. 7 discussed earlier. In the example of FIG. 8 discussed above, by means of the exposure correction process in Step S206, the graph GAa (FIG. 8) is modified give the characteristic of the solid line in the graph Gab, and by means of the tone correction process (gamma correction process) of Step S212, is then modified give the characteristic of the solid line in the graph GAc.

Figure 16:
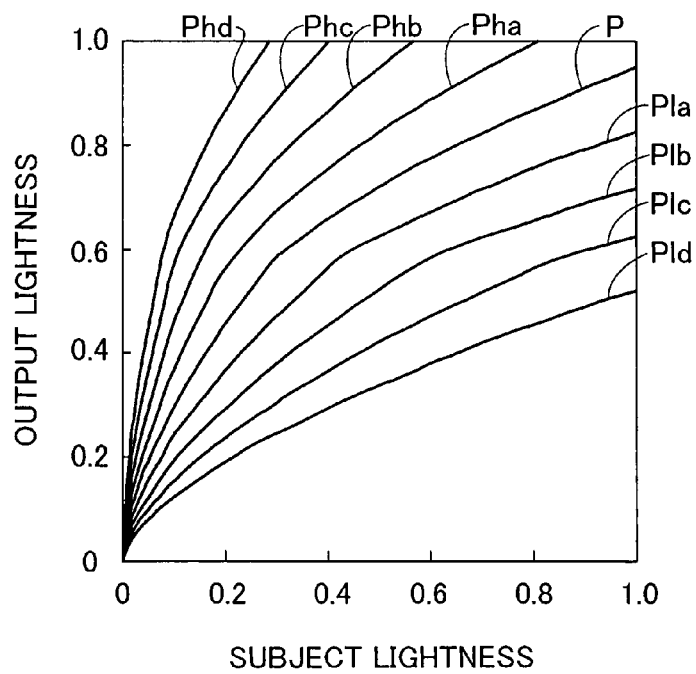
FIG. 16 shows tone characteristics P, Pha-Phd, Pla-Pld of image data for printing according to exposure correction levels.

FIG. 16 shows tone characteristics P, Pha-Phd, Pla-Pld of image data for printing according to exposure correction levels. Note that the tone characteristic P of FIG. 16 is the same as the tone characteristic P of FIG. 9 and is obtained if the exposure correction level is set to "±0 EV (no correction)." The characteristics Pha, Phb, Phc, and Phd are obtained if the exposure correction level is set to "+0.5 EV," "+1.0 EV," "+1.5 EV," and "+2.0 EV," respectively. The characteristics Pla, Plb, Plc, and Pld are obtained if the exposure correction level is set to "−0.5 EV," "−1.0 EV," "−1.5 EV," and "−2.0 EV," respectively.

The display image data adjusting module 244, in Step S122 of FIG. 3, adjusts the image data for display according to the exposure correction level that is established in the item "Exposure Correction" of the RAW image data print setting screen Wb (FIG. 6). Specifically, the image data for display is adjusted according to the exposure correction level, in such a way that the tone characteristic D of the image data for display is brought into approximation with the tone characteristic P, Pha-Phd, Pla-Pld of image data for printing according to the exposure correction level shown in FIG. 16. Note that even if image data for display is adjusted in accordance with exposure correction level, as noted previously the processing condition for the adjustment process varies depending on the type of camera which created the image data for display. By so doing, it is possible to execute the adjustment process appropriately according to exposure correction level, with reference to the tone characteristic of image data for display which may vary by individual type of camera.

Execution of the adjustment process in accordance with the exposure correction level using the three adjustment methods discussed earlier are described hereinbelow, on the assumption that RAW image file containing the image data for display is created by specific type of camera.

E-1. First Adjustment Method

In the first adjustment method, the display image data adjusting module 244, on the basis of Expression (3) below, performs adjustment process in accordance with the exposure correction level on the image data for display, to generate adjusted image data for display.

$$Y = A \cdot X \tag{3}$$

Here, A is a positive value that is established in accordance with exposure correction level, and that varies depending on the type of camera.

Table 2 below shows relationships between exposure correction levels and values of A in Expression (3) above. For example, if the exposure correction level is set to "+2.0 EV," the setting is "A=2.2." If the exposure correction level is set to "±0 EV (no correction)," the setting is "A=0.95" as mentioned previously in relation to Expression (1).

TABLE 2

| EXPOSURE CORRECTION LEVEL | A |
|---|---|
| +2.0EV | 2.2 |
| +1.5EV | 1.55 |
| +1.0EV | 1.35 |
| +0.5EV | 1.1 |
| ±0EV (no correction) | 0.95 |
| −0.5EV | 0.8 |
| −1.0EV | 0.7 |
| −1.5EV | 0.6 |
| −2.0EV | 0.55 |

Figure 17:
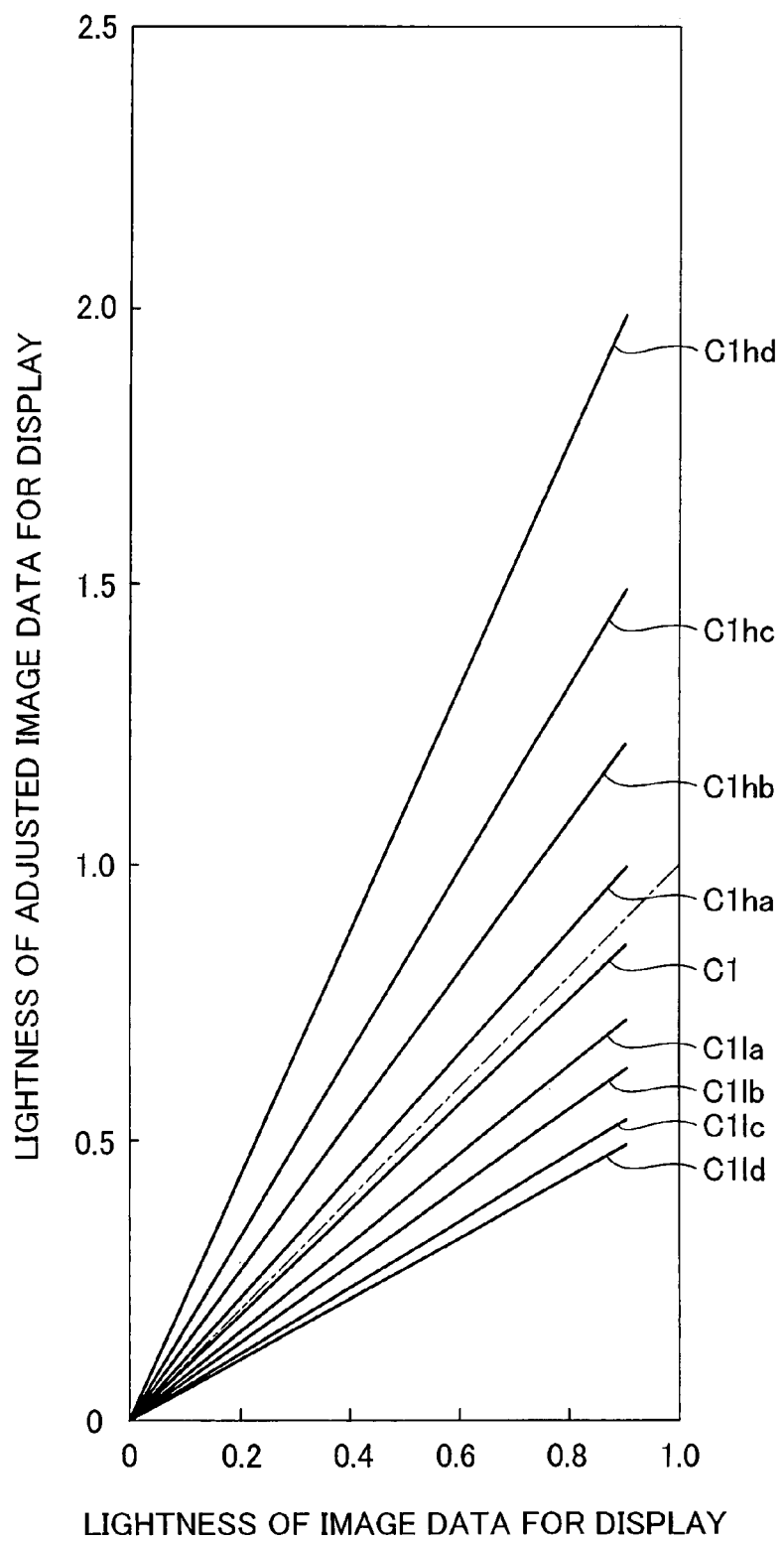
FIG. 17 shows the relationship between lightness of image data for display and lightness of adjusted image data for display according to exposure correction level, adjusted using the first adjustment method.

FIG. 17 shows the relationship between lightness of image data for display and lightness of adjusted image data for display according to exposure correction level, adjusted using the first adjustment method. The straight lines C1, C1ha-C1hd, and C1la-C1ld shown in FIG. 17 are represented by Expression (3) above. The line C1 of FIG. 17 is the same as the line C1 of FIG. 10. Note that, as in FIG. 16, the suffixes ("ha" etc.) of the symbols for the straight lines are associated with different exposure correction levels. The straight lines C1ha-C1hd and C1la-C1ld are associated with exposure correction levels of "+0.5 EV," "+1.0 EV," "+1.5 EV," "+2.0 EV," "−0.5 EV," "−1.0 EV," "−1.5 EV," and "−2.0 EV," respectively.

Figure 18:
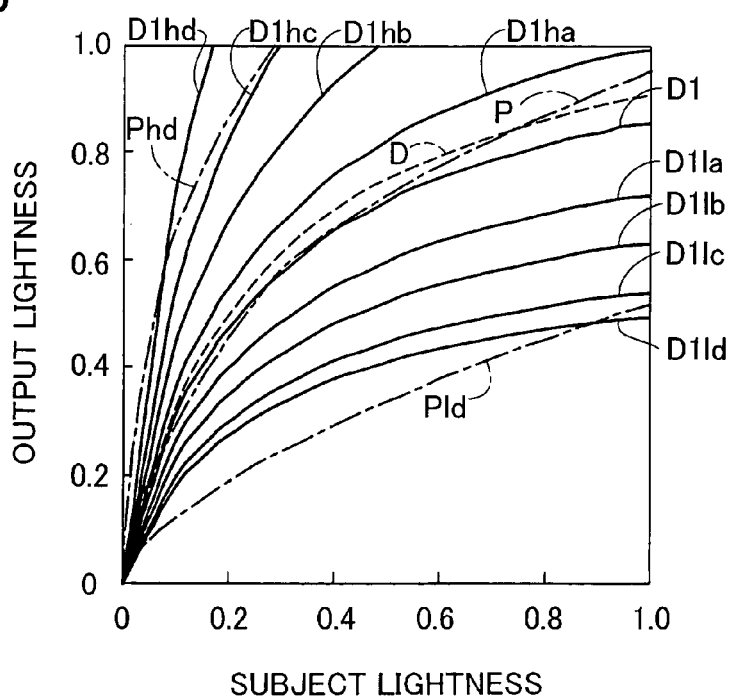
FIG. 18 shows tone characteristics D1, D1*ha*-D1*hd*, D1*la*-D1*ld* of adjusted image data for display according to exposure correction levels, adjusted using the first adjustment method.

FIG. 18 shows tone characteristics D1, D1ha-D1hd, D1la-D1ld of adjusted image data for display according to exposure correction levels, adjusted using the first adjustment method. The tone characteristic D1 of FIG. 18 is the same as the tone characteristic D1 of FIG. 11. Note that, as in FIG. 16, the suffixes ("ha" etc.) of the symbols for the tone characteristics are associated with different exposure correction levels. The tone characteristics D1ha-D1hd, D1la-D1ld are associated with exposure correction levels of "+0.5 EV," "+1.0 EV," "+1.5 EV," "+2.0 EV," "−0.5 EV," "−1.0 EV," "−1.5 EV," and "−2.0 EV," respectively. In FIG. 18, the tone characteristic D of the image data for display shown in FIG. 9, and the three tone characteristics P, Phd, Pld of the image data for printing shown in FIG. 16 are depicted as well.

As will be apparent from the tone characteristics D1, D1ha-D1hd, D1la-D1ld of the adjusted image data for display shown in FIG. 18, if the first adjustment method is employed, subsequent to the adjustment process, the tone characteristic D of image data for display can be brought into approximation with the tone characteristic P, Pha-Phd, Pla-Pld of image data for printing according to the exposure correction level. Moreover, since the first adjustment method utilizes Expression (3), the adjustment process according to exposure correction level can be carried out quickly and easily.

E-2. Second Adjustment Method

In the second adjustment method, the display image data adjusting module 244, on the basis of Expression (4) below, performs adjustment process in accordance with the exposure correction level on the image data for display, to generate adjusted image data for display.

$$Y = B \cdot X^C \quad (4)$$

Here, B and C are positive values that is established in accordance with exposure correction level, and that vary depending on the type of camera.

Table 3 below shows relationships between exposure correction levels and values of B and C in Expression (4) above.

For example, if the exposure correction level is set to "+2.0 EV," the settings are "B=1.3" and "C=0.6." If the exposure correction level is set to "±0 EV (no correction)," the settings are "B=1.05" and "C=1.2" as mentioned previously in relation to Expression (2).

TABLE 3

| EXPOSURE CORRECTION LEVEL | B | C |
|---|---|---|
| +2.0EV | 1.3 | 0.6 |
| +1.5EV | 1.25 | 0.7 |
| +1.0EV | 1.2 | 0.8 |
| +0.5EV | 1.2 | 1.1 |
| ±0EV (no correction) | 1.05 | 1.2 |
| −0.5EV | 0.9 | 1.2 |
| −1.0EV | 0.85 | 1.5 |
| −1.5EV | 0.65 | 1.4 |
| −2.0EV | 0.6 | 1.6 |

Figure 19:
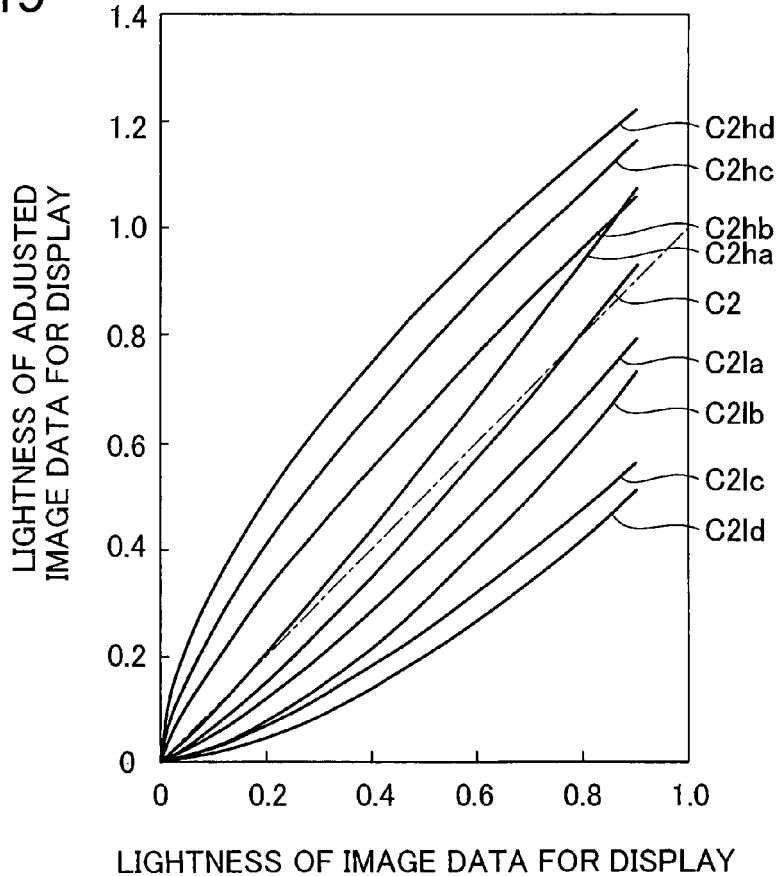
FIG. 19 shows the relationship between lightness of image data for display and lightness of adjusted image data for display according to exposure correction level, adjusted using the second adjustment method.

FIG. 19 shows the relationship between lightness of image data for display and lightness of adjusted image data for display according to exposure correction level, adjusted using the second adjustment method. The curves C2, C2ha-C2hd, and C2la-C2ld shown in FIG. 19 are represented by Expression (4) above. The curve C2 of FIG. 19 is the same as the curve C2 of FIG. 12. Note that, as in FIG. 16, the suffixes ("ha" etc.) of the symbols for the curves are associated with different exposure correction levels. The curves C2ha-C2hd and C2la-C2ld are associated with exposure correction levels of "+0.5 EV," "+1.0 EV," "+1.5 EV," "+2.0 EV," "−0.5 EV," "−1.0 EV," "−1.5 EV," and "−2.0 EV," respectively.

Figure 20:
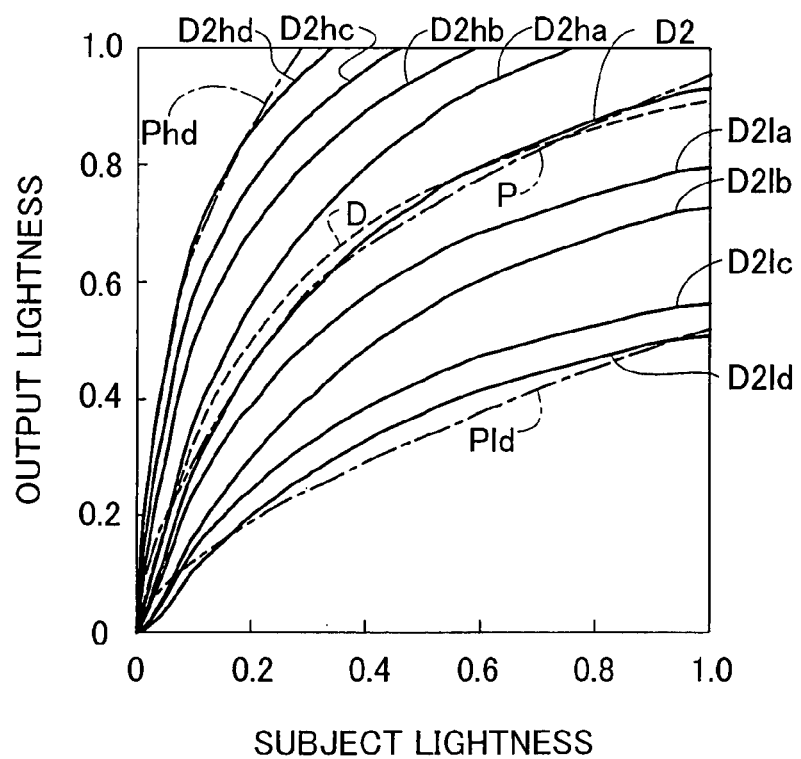
FIG. 20 shows tone characteristics D2, D2*ha*-D2*hd*, D2*la*-D2*ld* of adjusted image data for display according to exposure correction levels, adjusted using the second adjustment method.

FIG. 20 shows tone characteristics D2, D2ha-D2hd, D2la-D2ld of adjusted image data for display according to exposure correction levels, adjusted using the second adjustment method. The tone characteristic D2 of FIG. 20 is the same as the tone characteristic D2 of FIG. 13. Note that, as in FIG. 16, the suffixes ("ha" etc.) of the symbols for the tone characteristics are associated with different exposure correction levels. In FIG. 20, the tone characteristic D of the image data for display shown in FIG. 9, and the three tone characteristics P, Phd, Pld of the image data for printing shown in FIG. 16 are depicted as well.

As will be apparent from the tone characteristics D2, D2ha-D2hd, D2la-D2ld of the adjusted image data for display shown in FIG. 20, if the second adjustment method is employed, subsequent to the adjustment process, the tone characteristic D of the image data for display can be brought into approximation with the tone characteristic P, Pha-Phd, Pla-Pld of image data for printing according to the exposure correction level. Moreover, since the second adjustment method utilizes Expression (4), the adjustment process according to exposure correction level can be carried out quickly and easily.

E-3. Third Adjustment Method

In the third adjustment method, the display image data adjusting module 244 utilizes a LUT (lookup table), not shown, to performs adjustment process in accordance with exposure correction level on the image data for display, and generate adjusted image data for display.

Figure 21:
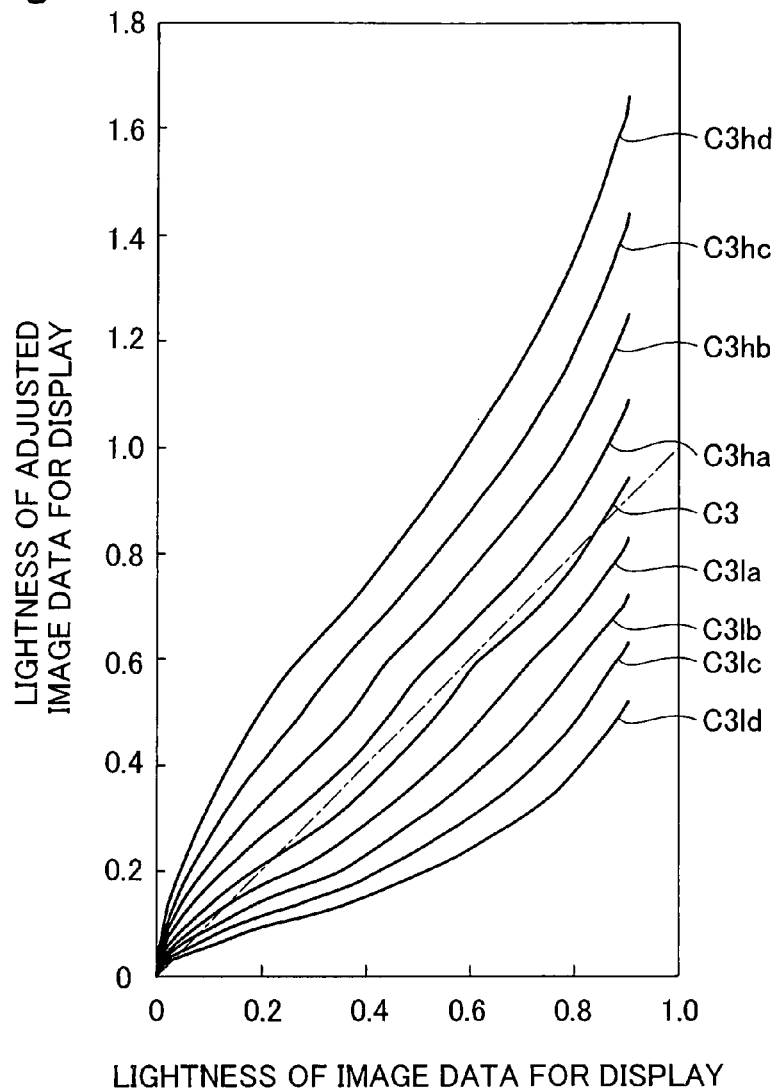
FIG. 21 shows the relationship between lightness of image data for display and lightness of adjusted image data for display according to exposure correction level, adjusted using the third adjustment method.

FIG. 21 shows the relationship between lightness of image data for display and lightness of adjusted image data for display according to exposure correction level, adjusted using the third adjustment method. The relationships indicated by the curves C3, C3ha-C3hd, and C3la-C3ld shown in FIG. 21 are registered in the LUT. The curve C3 of FIG. 21 is the same as the curve C3 of FIG. 14. Note that, as in FIG. 16, the suffixes ("ha" etc.) of the symbols for the curves are associated with different exposure correction levels. The curves C3*ha*-C2*hd* and C3*la*-C3*ld* are associated with exposure correction levels of "+0.5 EV," "+1.0 EV," "+1.5 EV," "+2.0 EV," "−0.5 EV," "−1.0 EV," "−1.5 EV," and "−2.0 EV," respectively. The relationship of each curve shown in FIG. 21 is established on the basis of the relationship between the tone characteristic D of the image data for display shown in FIG. 9, and each tone characteristic P, Pha-Phd, Pla-Pld of the image data for printing in accordance with the exposure correction level shown in FIG. 16, as described in FIG. 14.

While not shown in the drawing, if the third adjustment method is employed, subsequent to the adjustment process, the tone characteristic D of the image data for display can be made coincident with the tone characteristic P, Pha-Phd, Pla-Pld of the image data for printing according to the exposure correction level. Specifically, if the third adjustment method is employed, it is possible to make the brightness of the reference image and brightness of the printed image substantially the same by the user, for all exposure correction levels.

As described hereinabove, in the present embodiment the tone characteristic of image data for display is adjusted according to exposure correction level. Thus, the brightness of reference image can be modified according to exposure correction level, before executing developing process including exposure correction process. As a result, it is possible for the user to select a desired exposure correction level while checking the reference image on the display panel, and to easily set the exposure correction level without actually carrying out the developing process including the exposure correction process. During this process, since the brightness of the reference image can be changed immediately each time that an operation button is operated to set the exposure correction level to "+1.0 EV," "+1.5 EV," "+0.5 EV" and so on, the user can easily modify the exposure correction level setting without having to wait. Moreover, by executing printing at the exposure correction level selected in the setting screen Wb, a printed image having the desired brightness can be obtained, thus greatly improving convenience for the user.

In particular, in the present embodiment, image data for display is adjusted according to exposure correction level in such a way that the tone characteristic of image data for display is brought into approximation with the tone characteristic of image data for printing according to the exposure correction level. Thus, the user can quickly ascertain the brightness of printed image according to exposure correction level, before executing a time-consuming developing process, in other words, without waiting for completion of the developing process. As a result, needless execution of printing can be avoided.

Herein, adjusting the image data for display according to exposure correction level in such a way that "a tone characteristic of image data for display is brought into approximation with a tone characteristic of image data for printing according to the exposure correction level" refers to adjusting the image data for display according to the exposure correction level in such a way that, over at least a portion (e.g. the middle tone region) of the range of subject lightness (lightness of the RAW image data), a differential between the lightness of the adjusted image data for display and the lightness of the image data for printing corresponding to exposure correction level is smaller than a differential between the lightness of the image data for display and the lightness of the image data for printing corresponding to exposure correction level.

F. MODIFICATION EXAMPLES

F-1. First Modification Example

In the above embodiment, when the "RAW image print setting" selection button B2 is selected in the print setting selection screen W (FIG. 4), a RAW image print setting screen Wb (FIG. 6) that includes a reference image represented by the adjusted image data for display is displayed. Then, when the "Print" button BPb in the screen Wb is selected, printing is executed using the RAW image data. However, instead of this, printing may be executed using the adjusted image data for display.

Figure 22:
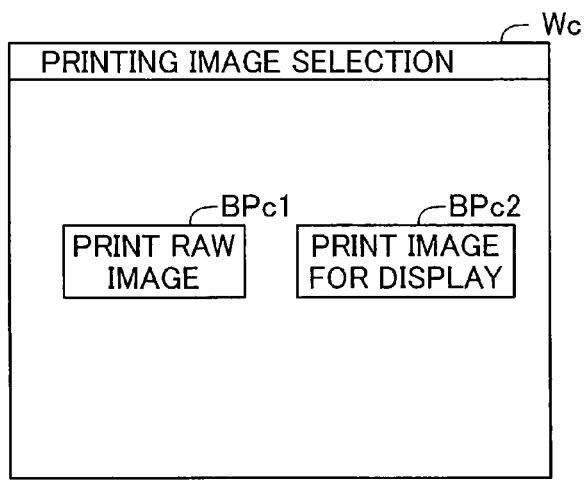
FIG. 22 shows a printing image selection screen Wc displayed in the first modification example.

FIG. 22 shows a printing image selection screen Wc displayed in the first modification example. Note that this selection screen Wc is displayed on the display panel 260 if the "Print" button BPb in the RAW image print setting screen Wb (FIG. 6) is selected. The selection screen Wc is prepared by the print data generating module 250.

As illustrated, the printing image selection screen Wc includes a "Print RAW Image" selection button BPc1 and a "Print Image for Display" selection button BPc2. If the "Print RAW Image" selection button BPc1 is selected, print data is generated from the RAW image data and printing is carried out using this print data. On the other hand, if the "Print Image for Display" selection button BPc2, print data is generated from the adjusted image data for display and printing is carried out using this print data.

Specifically, if the "Print" button BPb is selected in the RAW image print setting screen Wb (FIG. 6) in Step S102, the processing condition determining module 240 determines the processing conditions in the manner described previously in Step S124. Then, if the "Print RAW Image" selection button BPc1 is selected in the printing image selection screen Wc (FIG. 22), the developing process module 252 performs a developing process on the RAW image data in the manner described previously in Step S126. In Step S132, the developed image processing module 254 generates print data from the developed image data (image data for printing) in the manner described previously.

On the other hand, if the "Print" button BPb is selected in the RAW image print setting screen Wb (FIG. 6) in Step S102, processing condition determining module 240 determines the processing conditions in the manner described previously in Step S124. Then, if the "Print Image for Display" selection button BPc2 is selected in the printing image selection screen Wc (FIG. 22), the developed image processing module 254 generates print data from the adjusted image data for display in Step S132. Since the adjusted image data for display is image data that has already undergone a developing process in the camera, the developing process of Step S126 is skipped. That is, of the processing conditions determined in Step S124, processing conditions relating to the developing process are ignored.

According to this example, it is possible to perform printing rapidly using adjusted image data for display. Moreover, on the basis of the rapidly-obtained printed results, the user can decide whether to print using RAW image data. That is, by first carrying out printing experimentally using the adjusted image data for display so as to complete the process within a brief time, the user can refer to the printed results obtained experimentally using the adjusted image data for display, and decide whether to print using RAW image data, which takes a long time.

F-2. Second Modification Example

As will be apparent from comparison of FIG. 5 with FIG. 6, in the above embodiment, the RAW image print setting screen Wb does not include certain items (e.g., the item "Brightness Correction" and the item "Tint Correction") among the plurality of items that are included in the JPEG image print setting screen Wa. However, since processes that are executable on JPEG image data are also executable on RAW image data, the RAW image print setting screen Wb may include all of the plurality of items that are included in the JPEG image print setting screen Wa. For example, the JPEG image print setting screen Wa may include the four items of "Printer Paper," "Paper Size," "Print Quality," and "Red-eye Correction," while the RAW image print setting screen Wb may include these four items plus the other two items of "Exposure Correction" and "White Balance Correction." Alternatively, the JPEG image print setting screen Wa may include the six items shown in FIG. 5, while the RAW image print setting screen Wb may include the six items shown in FIG. 6, plus the two items of "Brightness Correction" and "int Correction."

In general, a second items group in a second setting screen will include a specific item that is not included in a first items group in a first setting screen. Also, the second items group in the second setting screen will include all of items that are included in the first items group in the first setting screen.

The invention is not limited to the above examples and embodiments set forth hereinabove, and can be reduced to practice in various ways without departing from the spirit thereof, such as the following variations, for example.

(1) In the above embodiment, the print setting selection screen W (FIG. 4) is displayed, but the selection screen W may be omitted. In this case, the JPEG image print setting screen Wa and the RAW image print setting screen Wb may be displayed through selection of a first button and a second button included in the operation section 270, respectively.

(2) In the above embodiment, the two setting screens Wa, Wb (FIGS. 5 and 6) include reference image display fields Fa, Fb, respectively. However, the reference image display fields Fa, Fb may be omitted. In this case, the display image data adjusting module 244 may be omitted as well.

(3) In the above embodiment, the reference image display field Fb is provided in one area of the RAW image print setting screen Wb, but the reference image display field Fb may instead be provided in the entire RAW image print setting screen Wb. In this case, the selection buttons, the plurality of items, and so on may be displayed superimposed on the reference image display field Fb.

(4) In the above embodiment, the RAW image file includes the RAW image data and image data for display. However the RAW image data and image data for display may instead be included in different files, and the RAW image data and image data for display may be associated with each other.

In the above embodiment, the RAW image file includes both the RAW image data and image data for display, but even if the file does not include the image data for display, it is possible to display a reference image in the reference image display field Fb. For example, if the RAW image file includes JPEG image data that has been recorded together with RAW image data, a reducing process on the JPEG image data may be performed in order to display a reference image in the reference image display field Fb. Alternatively, if the RAW image file does not include such JPEG image data, a quick developing process on the RAW image data may be performed in order to display a reference image in the reference image display field Fb. In the quick developing process, the number of pixels and/or the number of bits of each pixel of the RAW image data may be reduced.

(5) In the above embodiment, the adjustment process is performed on the image data for display if the exposure is corrected in Step S122 of FIG. 3 (i.e. where the setting is other than "±0 EV (no correction)"), however the adjustment process may instead be omitted if exposure is corrected. In this case as well, brightness of printed image and brightness of reference image may be recognized substantially the same by the user if exposure is not corrected.

Moreover, in the above embodiment, the adjustment process is performed on the image data for display if the exposure is not corrected in Step S122 of FIG. 3 (i.e. where the setting is "±0 EV (no correction)"), however the adjustment process may instead be omitted if exposure is not corrected. In this case as well, brightness of the reference image displayed in the reference image display field Fb can be modified depending on the exposure correction level if exposure is corrected.

(6) In the above embodiment, the range for exposure correction is +2.0 EV to −2.0 EV, but the range may instead be a wider range or a narrower range. Also, whereas in the above embodiment the exposure correction level is settable in 0.5 EV increments, it may instead be made settable in increments of 1.0 EV, of 0.25 EV, of 0.1 EV, and so on.

(7) In the above embodiment, three types of adjustment methods for adjusting the tone characteristic of image data for display are described, however other methods may be employed instead. For example, a method that combines the first adjustment method and the second adjustment method may be employed. In this case, the first adjustment method and the second adjustment method may be used selectively, depending on the brightness (tone value) of the image data for display.

(8) In the above embodiment, the type of camera that generated the RAW image file containing the RAW image data and the image data for display is identified by checking the manufacturer and model described in the header portion of the RAW image file, however it may instead be identified based on the camera manufacturer and model input by the user.

(9) In the embodiment, printing using JPEG image data and RAW image data is described, however printing may also be carried out using developed image data of other formats, such as BMP format.

(10) In the above embodiment, processing conditions for printing are determined, and image processing is then performed on the original image data according to the processing conditions to generate print data. However, instead of this, processing conditions for display may be determined, and image processing it then performed on original image data according to the processing conditions to generate display data. That is, the present invention may be implemented in image processing devices unrelated to printing. In general, an image processing device will determine processing conditions for image processing of original image data, and will execute image processing of the original image data according to the processing conditions.

While in the above embodiment, the present invention is applied to a printer 200, the present invention may be applied to a personal computer, image viewer device, camera or the like instead. In general, the present invention is applicable to a print control device that utilizes a display section and a print execution section. Note that the personal computer, image viewer device, camera or the like may be utilized as a print control device, or as an image processing device mentioned above.

(11) Part of the components realized by hardware in the above embodiments may be instead realized by software, and conversely, part of the components realized by software may be instead realized by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print control device that utilizes a display section and a print execution section, comprising:
 a processing condition determining section that determines processing conditions for printing using original image data; and
 a print data generating section that generates print data from the original image data according to the processing conditions, the print data being supplied to the print execution section,
 wherein the processing condition determining section comprises:
 a first setting section that, if the original image data is a first type of original image data that is developed, causes a first setting screen to be displayed on the display section, the first setting screen allowing a user to make settings for a first items group, for a purpose of determining the processing conditions for the first type of original image data; and
 a second setting section that, if the original image data is a second type of original image data that is undeveloped, causes a second setting screen to be displayed on the display section, the second setting screen allowing the user to make settings for a second items group, for a purpose of determining the processing conditions for the second type of original image data,
 wherein the second items group includes a specific item not included in the first items group; and
 wherein the print data generating section comprises:
 a developing process section that, if the original image data is the second type of original image data, executes on the second type of original image data a developing process that includes a specific process according to a setting for the specific item; and
 wherein
 the developing process section executes the developing process and generates developed image data for printing,
 the second setting section comprises:
 a display image data adjusting section that, prior to execution of the developing process, adjusts developed image data, as adjusted image data, for display corresponding to the second type of original image data, in such a way that a tone characteristic of the image data for display is brought into approximation with a tone characteristic of the image data for printing, and
 the second setting section causes to be displayed the second setting screen that includes an image represented by the adjusted image data for display.

2. A print control device according to claim 1, wherein the specific item is an item for setting an exposure correction level; and
 the specific process includes an exposure correction process executed according to the exposure correction level.

3. A print control device according to claim 1, wherein the second setting section, prior to execution of the developing process, cause to be displayed the second setting screen that includes an image representing a subject, using developed image data for display corresponding to the second type of original image data.

4. A print control device according to claim 1, wherein the print control device causes a selection screen to be displayed, the selection screen allowing the user to select whether to carry out printing using the image data for printing or using the adjusted image data for display.

5. A print control device according to claim 1, wherein the specific item is an item for setting an exposure correction level;
 the specific process includes an exposure correction process executed according to the exposure correction level; and
 the display image data adjusting section, prior to execution of the developing process, adjusts a tone characteristic of the image data for display according to the exposure correction level.

6. A print control device according to claim 5, wherein the display image data adjusting section executes the adjustment according to the exposure correction level, in such a way that the tone characteristic of the image data for display is brought into approximation with a tone characteristic of image data for printing according to the exposure correction level.

7. A print control device according to claim 1, wherein the second items group includes all of items included in the first items group.

8. A printer comprising:
 the display section;
 the print execution section; and
 the print control device according to claim 1.

9. A printer control device according to claim 1, wherein the display image data adjusting section adjusts brightness of the developed image data for display so as to bring a brightness of the developed image for display into approximation with brightness of printed image within a middle tone region.

10. A printer control device according to claim 9, wherein the display image data adjusting module section adjusts the brightness of the developed image data for display using:

$$Y = a \cdot X$$

wherein, X denotes brightness of the developed image data for display, Y denotes brightness of the adjusted image data for display, and a is a positive value that varies depending on a type of camera.

11. A printer control device according to claim 1, wherein the display image data adjusting section adjusts brightness of the developed image data for display so as to bring brightness of the developed image for display into approximation with brightness of printed image from a middle tone to bright regions.

12. A printer control device according to claim 11, wherein the display image data adjusting module section adjusts the brightness of the developed image data for display using:

$$Y = b \cdot X^c$$

wherein X denotes brightness of the developed image data for display, Y denotes brightness of the adjusted image data for display, and b and c are positive values that vary depending on a type of camera.

13. A printer control device according to claim 1, wherein the display image data adjusting section adjusts brightness of the developed image data for display so as to bring brightness of the developed image for display into approximation with brightness of the printed image throughout an entire tone range.

14. An image processing device comprising:
a processing condition determining section that determines processing conditions for image processing of original image data; and
an image processing section that executes image processing of the original image data according to the processing conditions;
wherein the processing condition determining section comprises:
a first setting section that, if the original image data is a first type of original image data that is developed, causes a first setting screen to be displayed on a display section, the first setting screen allowing a user to make settings for a first items group, for a purpose of determining the processing conditions for the first type of original image data; and
a second setting section that, if the original image data is a second type of original image data that is undeveloped, causes a second setting screen to be displayed on the display section, the second setting screen allowing the user to make settings for a second items group, for a purpose of determining the processing conditions for the second type of original image data,
wherein the second items group includes a specific item not included in the first items group; and
wherein
the image processing section, if the original image data is the second type of original image data, executes on the second type of original image data a developing process that includes a specific process according to a setting for the specific item;
the image processing section executes the developing process and generates developed image data for printing,
the second setting section comprises:
a display image data adjusting section that, prior to execution of the developing process, adjusts developed image data, as adjusted image data, for display corresponding to the second type of original image data, in such a way that a tone characteristic of the image data for display is brought into approximation with a tone characteristic of the image data for printing, and
the second setting section causes to be displayed the second setting screen that includes an image represented by the adjusted image data for display.

15. A print control method utilizing a display section and a print execution section, comprising:
(a) determining processing conditions for printing using original image data; and
(b) generating print data from the original image data according to the processing conditions, the print data being supplied to the print execution section,
wherein the determining of the processing conditions comprises:
(a1) if the original image data is a first type of original image data that is developed, causing a first setting screen to be displayed on the display section, the first setting screen allowing a user to make settings for a first items group, for a purpose of determining the processing conditions for the first type of original image data; and
(a2) if the original image data is a second type of original image data that is undeveloped, causing a second setting screen to be displayed on the display section, the second setting screen allowing the user to make settings for a second items group, for a purpose of determining the processing conditions for the second type of original image data,
wherein the second items group includes a specific item not included in the first items group; and
wherein the generating of the print data comprises:
if the original image data is the second type of original image data, executing on the second type of original image data a developing process that includes a specific process according to a setting for the specific item;
wherein
the step of generating print data, if the original image data is the second type of original image data, further executes on the second type of original image data a developing process that includes a specific process according to a setting for the specific item;
step (a2) further comprises:
a step of adjusting display image data adjusting that, prior to execution of the developing process, adjusts developed image data, as adjusted image data, for display corresponding to the second type of original image data, in such a way that a tone characteristic of the image data for display is brought into approximation with a tone characteristic of the image data for printing, and
step (a2) causes to be displayed the second setting screen that includes an image represented by the adjusted image data for display.

16. An image processing method comprising:
(a) determining processing conditions for image processing of original image data; and
(b) executing image processing of the original image data according to the processing conditions;
wherein the determining of the processing conditions comprises:
(a1) if the original image data is a first type of original image data that is developed, causing a first setting screen to be displayed on a display section, the first setting screen allowing a user to make settings for a first items group, for a purpose of determining the processing conditions for the first type of original image data; and
(a2) if the original image data is a second type of original image data that is undeveloped, causing a second setting screen to be displayed on the display section, the second setting screen allowing the user to make settings for a second items group, for a purpose of determining the processing conditions for the second type of original image data,
wherein the second items group includes a specific item not included in the first items group;
wherein
step (b), if the original image data is the second type of original image data, further executes on the second type of original image data a developing process that includes a specific process according to a setting for the specific item;
step (b) further executes the developing process and generates developed image data for printing,
step (a2) further comprises:
a step of adjusting display image data adjusting that, prior to execution of the developing process, adjusts developed image data, as adjusted image data, for display corresponding to the second type of original image data, in such a way that a tone characteristic of the image data for display is brought into approximation with a tone characteristic of the image data for printing, and
step (a2) causes to be displayed the second setting screen that includes an image represented by the adjusted image data for display.

17. A computer program product for causing a print control device that utilizes a display section and a print execution section to execute a processing, the computer program product comprising:
- a non-transitory computer readable medium; and
- a computer program stored on the computer readable medium,
- wherein the computer program comprises:
- a processing condition determining program that determines processing conditions for printing using original image data; and
- a print data generating program that generates print data from the original image data according to the processing conditions, the print data being supplied to the print execution section,
- wherein the processing condition determining program comprises:
- a first setting program that, if the original image data is a first type of original image data that is developed, causes a first setting screen to be displayed on the display section, the first setting screen allowing a user to make settings for a first items group, for a purpose of determining the processing conditions for the first type of original image data; and
- a second setting program that, if the original image data is a second type of original image data that is undeveloped, causes a second setting screen to be displayed on the display section, the second setting screen allowing the user to make settings for a second items group, for a purpose of determining the processing conditions for the second type of original image data,
- wherein the second items group includes a specific item not included in the first items group; and
- wherein the print data generating program comprises:
- a developing process program that, if the original image data is the second type of original image data, executes on the second type of original image data a developing process that includes a specific process according to a setting for the specific item;
- wherein
- the developing process program executes the developing process and generates developed image data for printing,
- the second setting program comprises:
- a display image data adjusting program that, prior to execution of the developing process, adjusts developed image data, as adjusted image data, for display corresponding to the second type of original image data, in such a way that a tone characteristic of the image data for display is brought into approximation with a tone characteristic of the image data for printing, and
- the second setting program causes to be displayed the second setting screen that includes an image represented by the adjusted image data for display.

18. A computer program product for causing an image processing device to execute a processing, the computer program product comprising:
- a non-transitory computer readable medium; and
- a computer program stored on the computer readable medium,
- wherein the computer program comprises:
- a processing condition determining program that determines processing conditions for image processing of original image data; and
- an image processing program that executes image processing of the original image data according to the processing conditions;
- wherein the processing condition determining program comprises:
- a first setting program that, if the original image data is a first type of original image data that is developed, causes a first setting screen to be displayed on a display section, the first setting screen allowing a user to make settings for a first items group, for a purpose of determining the processing conditions for the first type of original image data; and
- a second setting program that, if the original image data is a second type of original image data that is undeveloped, causes a second setting screen to be displayed on the display section, the second setting screen allowing the user to make settings for a second items group, for a purpose of determining the processing conditions for the second type of original image data,
- wherein the second items group includes a specific item not included in the first items group;
- wherein
- the image processing program, if the original image data is the second type of original image data, executes on the second type of original image data a developing process that includes a specific process according to a setting for the specific item;
- the image processing program executes the developing process and generates developed image data for printing,
- the second setting program comprises:
- a display image data adjusting program that, prior to execution of the developing process, adjusts developed image data, as adjusted image data, for display corresponding to the second type of original image data, in such a way that a tone characteristic of the image data for display is brought into approximation with a tone characteristic of the image data for printing, and
- the second setting program causes to be displayed the second setting screen that includes an image represented by the adjusted image data for display.

* * * * *